United States Patent
Suzuki

(10) Patent No.: US 9,087,524 B2
(45) Date of Patent: Jul. 21, 2015

(54) OPTICAL RECORDING MEDIUM DRIVE DEVICE, TRACKING ERROR DETECTION METHOD

(71) Applicant: Sony Corporation, Tokyo (JP)

(72) Inventor: Yuuichi Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/381,243

(22) PCT Filed: Jan. 17, 2013

(86) PCT No.: PCT/JP2013/050804
§ 371 (c)(1),
(2) Date: Aug. 27, 2014

(87) PCT Pub. No.: WO2013/132894
PCT Pub. Date: Sep. 12, 2013

(65) Prior Publication Data
US 2015/0138941 A1      May 21, 2015

(30) Foreign Application Priority Data
Mar. 6, 2012 (JP) .................................. 2012-048977

(51) Int. Cl.
*G11B 7/09* (2006.01)
(52) U.S. Cl.
CPC .............. *G11B 7/0906* (2013.01); *G11B 7/094* (2013.01); *G11B 7/0943* (2013.01)

(58) Field of Classification Search
None
See application file for complete search history.

(56) References Cited

U.S. PATENT DOCUMENTS

| | | | | |
|---|---|---|---|---|
| 5,986,999 | A * | 11/1999 | Takahashi | 369/44.29 |
| 2004/0196755 | A1 * | 10/2004 | Cheng | 369/44.25 |
| 2010/0080100 | A1 | 4/2010 | Hosokawa et al. | |

FOREIGN PATENT DOCUMENTS

| | | |
|---|---|---|
| JP | 63-175234 A | 7/1988 |
| JP | 3769888 A | 11/1998 |
| JP | 2002-237062 A | 8/2002 |
| JP | 2010-086589 A | 4/2010 |
| JP | 2012-064256 A | 3/2012 |

* cited by examiner

*Primary Examiner* — Wayne Young
*Assistant Examiner* — Brian Butcher
(74) *Attorney, Agent, or Firm* — Wolf, Greenfield & Sacks, P.C.

(57) ABSTRACT

As for a quadruple light receiving unit, in a case where divided regions of A to D as in a DPD scheme is defined, when binarization signals of light reception signals in regions A to D are set as signals A to D, <1> exclusive OR between the signal A without delay and the signal B with delay, <2> exclusive OR between the signal A with delay and the signal C without delay, <3> exclusive OR between the signal B without delay and the signal D with delay, and exclusive OR between the signal B with delay and the signal D without delay are calculated, and a tracking error signal is obtained on the basis of the calculation of (<1>+<3>)−(<2>+<4>). Thus, the above problem can be solved.

7 Claims, 15 Drawing Sheets

EDGE DETECTION PHASE COMPARATOR

OPTICAL RECORDING MEDIUM DRIVE DEVICE, TRACKING ERROR DETECTION METHOD

TECHNICAL FIELD

The present technology relates to an optical recording medium drive device that performs at least playback and a tracking error detection method, for an optical recording medium.

BACKGROUND ART

Disc-shaped optical recording media (each hereinafter referred to simply as optical disc) such, for example, as a CD (Compact Disc), a DVD (Digital Versatile Disc) and a BD (Blu-ray Disc: trademark registered) have widely spread. In the standards of these optical discs, a DPD (Differential Phase Detection) scheme is widely employed as a tracking error detection scheme for a playback-dedicated ROM disc.

FIG. 10 is an explanatory drawing of a tracking error detection technique based on the DPD scheme. In the DPD scheme, as first illustrated in FIG. 10A, a light receiving unit in which four light receiving regions of A, B, C and D are dividedly formed is used as a light receiving unit for receiving reflected light from an optical disc. Herein, in such a quadruple light receiving unit, the regions A, B, C and D are formed by segmentation with a division line that extends in the longitudinal direction of a track (linear direction) and a division line that extends in the short-side direction thereof (disc radial direction) on the basis of the track, as the reference, formed of pits (shaded parts in the figure) lined up on the optical disc. Specifically, in the DPD scheme, each of a group of the regions A and B and a group of the regions C and D is a group obtained by segmentation with the division line in the track longitudinal direction and each of a group of the regions A and D and a group of the regions B and C is a group obtained by segmentation with the division line in the track short-side direction. Moreover, when an upstream side and a downstream side are defined on the basis of the direction, as the reference, of advancement of the pits in accordance with rotation of the optical disc, the group of the regions A and B is arranged on the upstream side and the group of the regions C and D on the downstream side.

FIG. 10A schematically illustrates a situation of transition in a pit passing through relative to the light receiving unit (time points t1 to t5). At time point t1, there is illustrated a state where the heading edge part of the pit reaches the vicinity of the upstream side end part of the light receiving unit, at time point t2, a state where the heading edge part reaches the vicinity of the track short-side direction division line of the light receiving unit, at time point t3, a state where the heading edge part reaches the vicinity of the downstream side end part of the light receiving unit, at time point t4, a state where the ending edge part of the pit reaches the vicinity of the track short-side direction division line of the light receiving unit, and at time point t5, a state where the ending edge part reaches the vicinity of the downstream side end part of the light receiving unit. In the left of the plane, there is illustrated a situation of the beam spot detracking on the left side relative to the track center, in the center thereof, a situation of the beam spot tracing the track center, and in the right thereof, a situation of the beam spot detracking on the right side relative to the track center.

In the DPD scheme, on the basis of the light reception results of the four regions A to D in the light receiving unit, a signal (A+C) and a signal (B+D) are generated and a phase difference between these (phase difference arising in the light receiving unit due to optical interference) is detected to generate a tracking error signal TES. Notably, the signal (A+C) means the addition result of a signal A and a signal C generated on the basis of the light reception results of the respective regions A and C and the signal (B+D) means the addition result of a signal B and a signal D generated on the basis of the light reception results of the respective regions B and D.

FIG. 10B illustrates waveforms of the signal (A+C) and the signal (B+D) obtained during time points t1 to t5 in the occasion of detracking on the left side (in the left of the plane), in the occasion of tracing the track center (in the center of the plane) and in the occasion of detracking on the right side (in the right of the plane) illustrated in FIG. 10A, respectively. As illustrated in the figure, in the occasion of tracing the track center, a phase difference does not arise between the signal (A+C) and the signal (B+D). In the occasion of detracking on the left side, a phase difference arises such that the phase of the signal (A+C) advances, and conversely, in the occasion of detracking on the right side, a phase difference arises such that the phase of the signal (B+D) advances.

FIG. 10C illustrates a situation of generating the tracking error signal TES from the signal (A+C) and the signal (B+D) on the basis of the DPD scheme. As illustrated in the figure, the phase difference between the signal (A+C) and the signal (B+D) is detected, including information of its polarity (which phase is advanced/delayed) and the tracking error signal TES is generated on the basis of the result. The figure illustrates examples of waveforms obtained in the occasion of the beam spot having passed through the track center from the left side to the right side for the individual signals of the signal (A+C) and the signal (B+D), the polarity signals of these, the phase difference detection signal between the signal (A+C) and the signal (B+D) (including the polarity information), and the tracking error signal TES generated from the phase difference detection signal.

FIG. 11 illustrates a phase comparator, by way of example, essential in the case where the DPD scheme is employed. The phase comparator illustrated in FIG. 11 is a so-called EXOR (EX-OR: EXclusive OR) phase comparator. As illustrated in the figure, the EXOR phase comparator is at least provided with an EXOR circuit and a flip-flop to which the binarized signal (A+C) and the binarized signal (B+D) are respectively inputted, two AND gate circuits and an operational amplifier.

The output from the EXOR circuit in the FIG. is "1" when two input signals are different from each other and is "0" when they are same. The flip-flop in the bottom discriminates the difference, between the signals, detected by the EXOR circuit to represent phase advancement or to represent phase delay, determining the polarity of the phase comparator output.

Use of such a phase comparator, for example, enables the tracking error signal TES to be generated on the basis of the DPD scheme as described using FIG. 10C above.

CITATION LIST

Patent Literature

Patent Literature 1: JP 3769888B
Patent Literature 2: JP S63-175234A

SUMMARY OF INVENTION

Technical Problem

By the way, a stable DPD tracking error signal is being put in a situation where its generation is difficult as the optical disc has its increasing recording density in recent years. This is because of the following reasons.

(1) The playback signals from short pits attenuate under the influence of an MTF (spatial frequency) as a result of the enhanced recording density in the linear direction and thus they are difficult to be discriminated.

(2) The influence of an offset due to cross talk becomes large as a result of the narrow track pitch.

(3) The playback signal amplitude attenuates as a result of progress of multi-layering and the S/N (signal-to-noise ratio) is caused to be poor.

(4) The playback signal frequency is enhanced in accordance with improvement of the data rate.

Items (1) to (3) influence the signal quality of the signals A to D obtained by binarization of light reception signals from the regions A to D to be deteriorated. Examples of specific modes of the signal deterioration here can include chattering, pulse width fluctuation and local pulse deficiency as illustrated in FIG. 12. The influence of items (1) to (3) causes these phenomena to arise in high frequency.

Moreover, the influence of item (4) causes a signal generation block of the DPD tracking error signal to require an enhanced response speed and thus its implementation to be being difficult.

These problems will be discussed specifically below.

[a. Phase Detection Error Caused by Pulse Width Fluctuation of Binarization Signal]

The EXOR phase detector as illustrated in FIG. 11 as above causes a problem that fluctuation of the pulse widths of the signals A to D leads to phase detection errors.

FIG. 13 is an explanatory drawing of a phase detection error caused by pulse width fluctuation. Specifically, FIG. 13 illustrates a situation where faulty phase detection arises when signals whose phases coincide with each other and which are different in pulse width from each other are inputted as the signal (A+C) and the signal (B+D) in the EXOR phase comparator. It is supposed that the signal (A+C) affords a waveform represented by the solid line in the figure due to occurrence of the pulse width fluctuation while it should afford a waveform represented by the broken line therein by nature. In this case, as the "phase comparator output" in the figure indicates, the phase comparison result results in representing that the phase of the signal with a long pulse width advances. For example, in the case of occurrence of objective lens shift or in the case of occurrence of positional shift of the beam spot due to some other cause, the pulse width fluctuation arises continuously. In this stage, even if smoothing is performed downstream using a LPF (low-pass filter), fluctuation of the tracking error signal cannot be prevented from presenting.

[b. Phase Detection Error Caused by Binarization Signal Chattering]

There is also a so-called edge detection phase comparator as illustrated in FIG. 14 as the phase comparator. The edge detection phase comparator is disclosed also in Patent Literature 2, for example. In the edge detection phase comparator, even if the pulse width fluctuation pointed out above in section [a] arises, the output due to the pulse width fluctuation is a positive and negative pulse output. Therefore, smoothing in the downstream LPF can compensate the influence.

It should be noted that the edge detection phase comparator causes the problem of occurrence of the phase detection error in the occasion of chattering arising more in one signal of the input signals.

FIG. 15 is an explanatory drawing of a phase detection error caused by chattering. Specifically, FIG. 15 exemplarily illustrates a phase comparator output obtained by an edge detection phase comparator in the occasion of chattering arising only in the signal (A+C) in regard to the signal (A+C) and the signal (B+D) which should have the same pulse width and the same phase by nature.

For example, when the objective lens shift arises with respect to a signal output which deteriorates in S/N or when the positional shift of the laser spot arises due to some other cause, a situation where chattering arises in one signal of the input signals in high frequency as illustrated in the figure can continue. Once the phase comparator output as illustrated in the figure has been obtained, fluctuation of the tracking error signal cannot be prevented from presenting even if smoothing using the LPF is performed downstream.

Herein, if chattering arises similarly in the two input signals, although there is no offset in the phase detection result, the phase difference which should be detected by nature results in its attenuation, and as a result, the same takes place to be faulty detection of the tracking error.

Notably, such a problem in regard to chattering also arises in the case of use of the EXOR phase comparator. Specifically, when the chattering arises in the case where the EXOR one is used, phase advancement/delay decision using a flip-flop is not performed correctly, this causing fluctuation, of the tracking error signal, which cannot be processed by smoothing with the LPF to arise.

[c. Problem Regarding Increase of Playback Signal Frequency]

In order to realize the tracking error detection technique as illustrated in FIG. 10C as above, the phase comparator is required to output a pulse shorter than the channel clock in high precision for correctly detecting a difference between edge positions of the signal (A+C) and the signal (B+D).

Herein, for example, in playing back a BD at 6× (sextuple-speed), 2T signal frequency which is the shortest mark length reaches up to approximately 198 MHz. Namely, a conventional phase comparator needs gate elements that correctly output a pulse with a time width of a signal phase difference far shorter than such a 2T signal interval. Here, if the gate elements cause delay and/or imbalance between rising edge characteristics and falling edge characteristics, this eventually leads to offset fluctuation, amplitude fluctuation and decrease of S/N of the tracking error signal. Securing high-speed response in high precision also in consideration of temperature-dependent fluctuation and solid unevenness is obstruction factor in designing.

Moreover, some conventional DPD tracking error detection circuits employ a method of processing the binarization signal in a digital synchronization circuit to detect the phase difference. The phase comparator in this case is frequently necessary to operate at a clock frequency not less than the channel clock. For example, when it is supposed that direct detection of phase shift of approximately ¼ of 2T signal interval is required under the conditions for the BD at sextuple-speed mentioned above, the digital synchronization circuit in this case is necessary to operate in clock of 400 MHz at least. This is a speed not less than typical read channel operation clock and can still cause obstruction factor in designing.

[d. Phase Differences Between Signals A and B and Between Signals C and D Arising Depending on Pit Depth]

While this problem is not relevant to items (1) to (4) above, it is one of the problems that have been being tackled since proposal of the DPD scheme.

This problem caused by the pit depth is mentioned also in Patent Literature 1 above. Specifically, it is a problem that phase differences arise between the signal A and the signal B and between the signal C and the signal D caused by the depth of pits formed in the optical disc.

If analog signal additions of the signal A and the signal C, and the signal B and the signal D are performed in no consideration of this problem, the signal amplitude attenuates, resulting in faulty detection of the tracking error. Notably, in order to solve the problem, Patent Literature 1 proposes methods, for example, of adding variable delay circuits, for example, to the signals C and D sides.

The present technology is devised in view of the above-mentioned problems, and a problem to be solved is to enable stable tracking error detection on the basis of a light reception signal which deteriorates due to the increased recording density of the optical recording medium, and in addition, to solve the problem due to the high playback speed and to solve the problem due to the phase difference between the signals A and B and between the signals C and D arising caused by the depth of pits.

Solution to Problem

To solve the above-mentioned problems, the following configuration is proposed for an optical recording medium drive device in the present technology. Namely, an optical recording medium drive device of the present technology includes a light irradiation unit that irradiates an optical recording medium with light. Further, a light receiving unit that receives reflected light from the optical recording medium and in which four regions of a first region, a second region, a third region and a fourth region are dividedly formed with a linear direction division line that extends in a direction corresponding to a longitudinal direction of a track formed in the optical recording medium and a tracking direction division line that extends in a direction corresponding to a short-side direction of the track is included, the first region and second region and the third region and fourth region being respectively segmented with the linear direction division line, the first region and fourth region and the second region and third region being respectively segmented with the tracking direction division line, the first region and second region and the third region and fourth region being arranged on an upstream side and a downstream side, respectively, on the basis of a direction of advancement of the track as a reference. Further, a binarization unit that obtains binarization signals based on light reception signals which are obtained by the regions for light reception in the light receiving unit as a first signal, a second signal, a third signal and a fourth signal, respectively, is included. Further, delay units that delay the first signal, the second signal, the third signal and the fourth signal, respectively, are included. Further, a first exclusive OR calculation unit that calculates exclusive OR between the first signal inputted not via the delay unit and the third signal inputted via the delay unit, a second exclusive OR calculation unit that calculates exclusive OR between the first signal inputted via the delay unit and the third signal inputted not via the delay unit, a third exclusive OR calculation unit that calculates exclusive OR between the second signal inputted not via the delay unit and the fourth signal inputted via the delay unit, and a fourth exclusive OR calculation unit that calculates exclusive OR between the second signal inputted via the delay unit and the fourth signal inputted not via the delay unit are included. Further, an operation unit that calculates a difference between a sum of the pieces of exclusive OR calculated by the first and third exclusive OR calculation units, respectively, and a sum of the pieces of exclusive OR calculated by the second and fourth exclusive OR calculation units, respectively, is included.

Herein, the pieces of exclusive OR calculated by the first to fourth exclusive OR calculation units are placed as <1>, <2>, <3> and <4>, respectively. It should be confirmed that <1> is the exclusive OR between the first signal without delay and the third signal with delay, <2> is the exclusive OR between the first signal with delay and the third signal without delay, <3> is the exclusive OR between the second signal without delay and the fourth signal with delay and <4> is the exclusive OR between the second signal with delay and the fourth signal without delay. Moreover, as mentioned above, the first and second signals are the binarization signals for the light receiving regions arranged on the upstream side. On the other hand, the third and fourth signals are the binarization signals for the light receiving regions arranged on the downstream side. First, when it is supposed that the sum of <1> and <3> and the sum of <2> and <4> do not have delay by the respective delay units, it is known that they are the same signals each of which is a "sum of the exclusive OR between the first and third signals and the exclusive OR between the second and fourth signals". As also mentioned later, a signal based on the "sum of the exclusive OR between the first and third signals and the exclusive OR between the second and fourth signals" tends to take its minimum value in the occasion of tracing the track center and to increase in its amplification in accordance with the detracking amount in the occasion of detracking (irrespective of its direction) (refer to the signal of <5> in FIG. 5). Specifically, the signal takes its minimum value at the track center and takes its maximum value at the middle point between the track centers. The signal as above is a signal with shift (advancement) by 90 degrees relative to the ideal tracking error signal only in terms of its phase. Hereinafter, such a signal based on the "sum of the exclusive OR between the first and third signals and the exclusive OR between the second and fourth signals" is referred to as "cross track signal". Herein, as mentioned above, the first and second signals and the second and fourth signals are the binarization signals for the light receiving regions arranged on the upstream side and the downstream side, respectively. In consideration of these, it is known that the sum of <1> and <3> calculated by the operation unit is one having the signals on the downstream side given delay with respect to the cross track signal (sum of the exclusive OR between the first and third signals and the exclusive OR between the second and fourth signals). Meanwhile, it is known that the sum of <2> and <4> calculated by the operation unit is one having the signals on the upstream side given delay with respect to the same cross track signal. With respect to the same cross track signal, when the signals on the downstream side which constitute this are given delay, the phase can be delayed by an amount corresponding to the delay time, and meanwhile, when the signals on the upstream side are given delay, the phase can be advanced by an amount corresponding to the delay time. In this stage, properly configuring the delay time allows the signal having the cross track signal delayed in its phase by 90 degrees to be obtained as the signal of the sum of <1> and <3> calculated by the operation unit. Meanwhile, for the signal of <2> and <4>, the signal having the cross track signal advanced in its phase by 90 degrees can be obtained. In other words, the signal whose phase coincides with that of the ideal tracking error signal can be obtained as the signal of the sum of <1> and <3>. The signal which has the phase reverse to that of the signal of the sum of <1> and <3> (that is, the phase reverse to that of the ideal tracking error signal) can be obtained as the signal of the sum of <2> and <4>. It should be noted in this stage that the cross track signal which is the signal based on the "sum of the exclusive OR between the first and third signals and the exclusive OR between the second and fourth signals" and the signal of the sum of <1> and <3> and the signal of the sum of <2> and <4> which signals correspond to signals which are changed in their phases are superimposed with an offset caused by deterioration of the binarization signals due to the increased recording density and the like (for example, refer to X in FIG. 5). Taking this into consideration, in the present technology as mentioned above, the difference between the sum of <1> and <3> and the sum of <2> and <4> is calculated. By doing so, the offset component can be compensated. As a result, a signal whose phase coincides with that of the ideal tracking error signal and which properly represents the polarity of tracking error can be obtained. Namely, even when binarization signals deteriorate caused by the increased recording density and the like, a proper tracking error signal can be generated and stable tracking error detection can be performed.

Herein, a conventional DPD detection circuit tends to suffer a large decrease of precision of tracking error detection against pulse width fluctuation, chattering and the like occurring due to the increased recording density for the above-mentioned reasons. On the contrary, in the present technology, the influence of pulse width fluctuation, chattering and the like presents as a signal offset (offset superimposed on the signal of the sum of <1> and <3> and the signal of the sum of <2> and <4> mentioned above). Since the offset is compensated in the generation process of the tracking error signal as mentioned above, the situation where the tracking error detection precision decreases due to pulse width fluctuation, chattering and the like can be prevented. Accordingly, the problems of phase detection errors in sections [a] and [b] above can be effectively prevented from taking place. Moreover, in the present technology, since high-speed operation as approximately fast as that under the channel clock is not necessary, the problem above caused by increase of the playback signal frequency in section [c] can be prevented from taking place. Moreover, as to the problem in section [d] caused by the phase differences arising between the signals A and B and the signals C and D, respectively, due to the pit depth, in the present technology, either the signals A and C or the signals B and D are not added, but a phase relation between A and C (phase relation between the first signal and the third signal) and a phase relation between B and D (phase relation between the second signal and the fourth signal) are detected. The tracking error is detected using such information. By doing so, even when the phase differences between the signals A and B and the signals C and D arise caused by the pit depth, the tracking error can be detected properly.

Advantageous Effects of Invention

As mentioned above, according to the present technology, stable tracking error detection can be performed on the basis of a light reception signal which deteriorates due to the increased recording density of an optical recording medium. Moreover, the problem due to the enhanced playback speed can be solved. Furthermore, the problem, of faulty detection of the tracking error, caused by the phase differences between the signals A and B and between the signals C and D arising depending on the pit depth can be solved.

DESCRIPTION OF EMBODIMENTS

Hereafter, embodiments according to the present technology are described. Notably, the description is made in the following order.

<1. First Embodiment>
[1-1. Overall Configuration of Playback Device]
[1-2. Configuration of Tracking Error Signal Generation System]
[1-3. Tracking Error Signal in Embodiment]
[1-4. Method of Using Cross Track Signal]
<2. Second Embodiment>
<3. Modifications>

1. First Embodiment 1-1. Configuration of Playback Device

Figure 1:
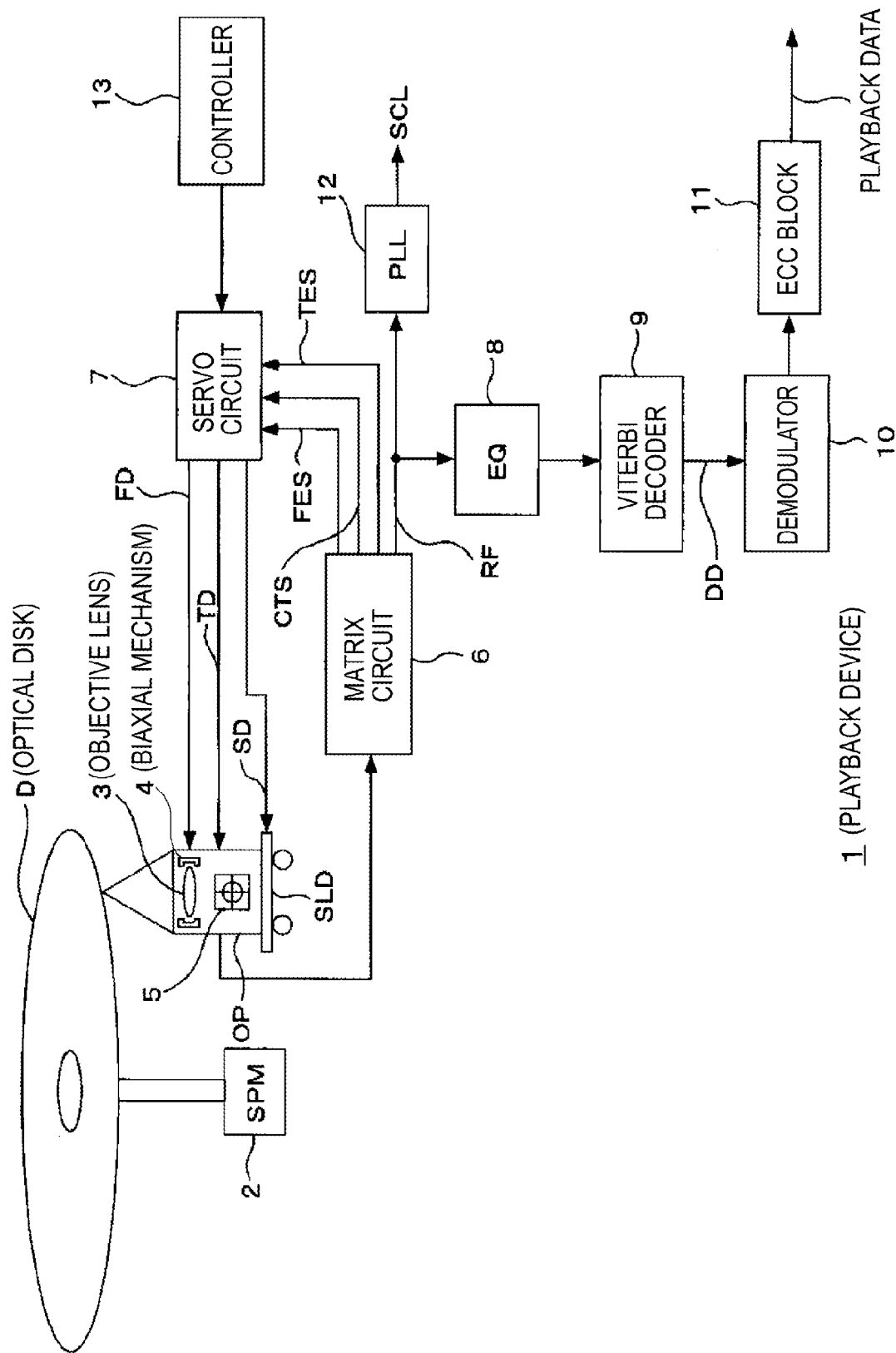
FIG. 1 is a block diagram of an internal configuration of an optical recording medium drive device as an embodiment.

FIG. 1 is a block diagram illustrating an internal configuration of a playback device 1 as an embodiment according to an optical recording medium drive device of the present technology. Notably, in FIG. 1, only a playback system and a servo system (a tracking servo and a focus servo) for signals recorded in an optical disc D of the playback device 1 are mainly illustrated and the other parts are omitted.

First, the optical disc D is driven to rotate in accordance with a predetermined rotation drive method by a spindle motor (SPM) 2 illustrated in the figure in the state where it is mounted on a turn table (not shown) provided in the playback signal 1. The rotation control of the spindle motor 2 is performed by a not-shown spindle servo circuit.

Herein, a playback-dedicated ROM disc is assumed as the optical disc D according to the embodiment, and specifically, a high recording density disc such as a BD (Blu-ray Disc: trademark registered) undergoes playback, for example, under conditions where the aperture ratio NA of an objective lens 3 mentioned later is approximately 0.85 and the wavelength of the laser is approximately 405 nm.

An optical pickup OP in the figure reads out a recording signal with respect to the optical disc D driven to rotate by the spindle motor 2. The optical pickup OP includes a laser diode (not shown) which is a laser light source, the objective lens 3 for condensing the laser light from the laser diode on a recording surface of the optical disc D for irradiation thereof, and a quadruple detector 5 that detects light having the laser light reflected on the optical disc D. Furthermore, a biaxial mechanism 4 that holds the objective lens 3 in a displaceable manner in the tracking direction and the focusing direction is provided. The biaxial mechanism 4 includes a tracking coil and a focusing coil. To the tracking coil and the focusing coil, a tracking drive signal TD and a focusing drive signal FD from a servo circuit 7 mentioned later are supplied, so that the objective lens 3 is configured to be driven in the tracking direction and the focusing direction. It should be confirmed that the tracking direction is the short-side direction of the track formed in the optical disc D. Namely, it is a direction in the relationship of being perpendicular to the rotational direction of the optical disc D (longitudinal direction of the track). Moreover, the focusing direction is a direction toward and away from the optical disc D.

Figure 2:
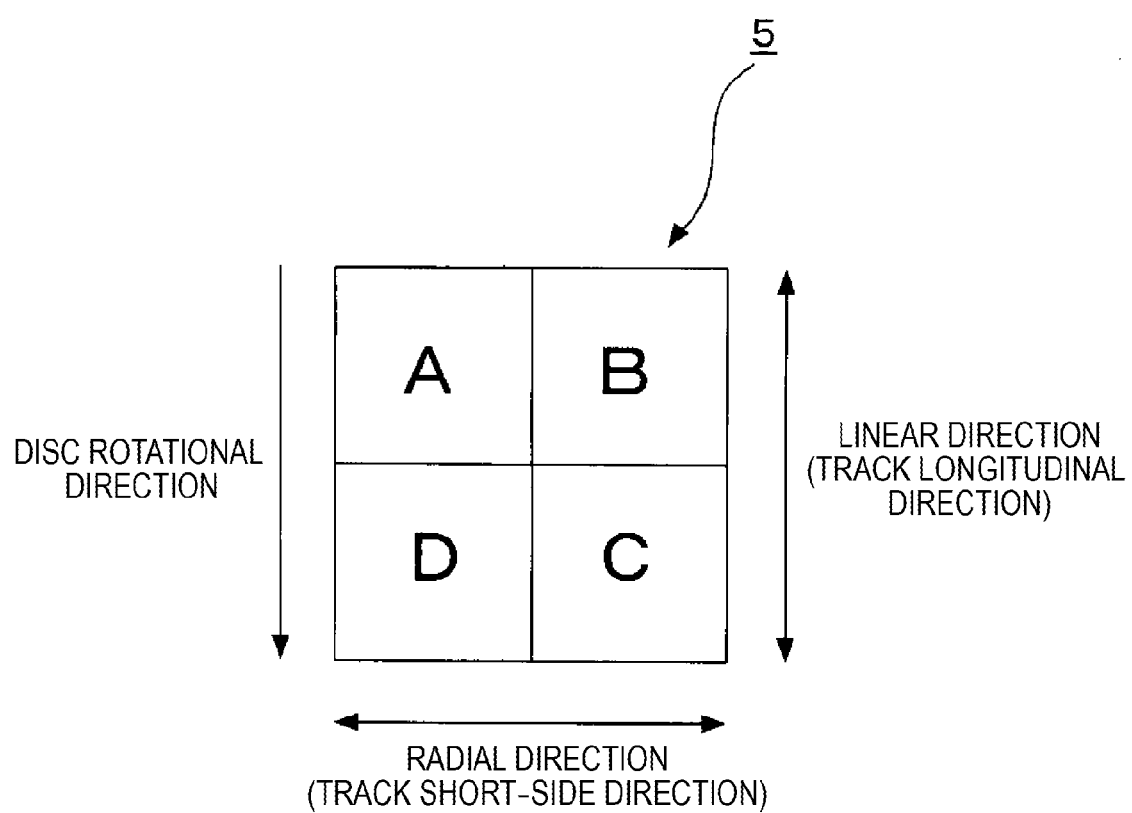
FIG. 2 is an explanatory drawing of a configuration of a light receiving unit included in the optical recording medium drive device according to the embodiment.

Herein, arrangement of detectors (A, B, C and D) of the quadruple detector 5 in the optical pickup OP is described with reference to FIG. 2. As illustrated in FIG. 2, a region of the quadruple detector 5 in this case is divided by a linear direction division line which extends in a direction corresponding to the longitudinal direction of the track on the optical disc D and a tracking direction division line which extends in a direction corresponding to the short-side direction of the track (radial direction) such that the four detectors A, B, C and D are formed. Specifically, the detectors A to D afford a group of the detector A and the detector B and a group of the detector C and the detector D each group of which is obtained by segmentation with the linear direction division line and a group of the detector A and the detector D and a group of the detector B and the detector C each group of which is obtained by segmentation with the tracking direction division line. Moreover, while the disc rotational direction is indicated by the single arrow in the figure, when an upstream side and a downstream side are defined on the basis of the direction, as the reference, of advancement of tracks (pit rows) according to rotation of the optical disc D, the group of the detector A and the detector B is a group formed on the upstream side and the group of the detector C and the detector D is one on the downstream side. It should be confirmed that the upstream side means the side where the pit arrives earlier.

The explanation returned to FIG. 1, light reception signals obtained by the quadruple detector 5 are supplied to a matrix circuit 6. The matrix circuit 6 generates a playback signal RF, a tracking error signal TES and a focusing error signal FES on the basis of the light reception signals. Moreover, in this example, the matrix circuit 6 also generates a cross track signal CTS. Notably, a configuration of a generation system, in particular, of the tracking error signal TES and the cross track signal in the matrix circuit 6 is again described later.

The tracking error signal TES, the focusing error signal FES and the cross track signal CTS generated by the matrix circuit 6 are supplied to a servo circuit 7. The servo circuit 7 performs predetermined operations such as filtering and loop gain processing for phase compensation and the like with respect to each of the tracking error signal TES and the focusing error signal FES to generate a tracking servo signal TS and a focus servo signal FS. Then, it generates the tracking drive signal TD and the focusing drive signal FD on the basis of the tracking servo signal TS and the focus servo signal FS to supply these to the tracking coil and the focusing coil of the biaxial mechanism 4 in the optical pickup OP.

Herein, the servo circuit 7 performs the operation as above, so that the above-mentioned quadruple detector 5, matrix circuit 6, servo circuit 7 and biaxial mechanism 4 form a tracking servo loop and a focus servo loop. Formation of the tracking servo loop and the focus servo loop allows a beam spot of the laser light with which the optical disc D is irradiated to trace the track (pit row) formed in the optical disc D and a proper focusing state (in-focus state) to be maintained.

Moreover, the servo circuit 7 turns off the tracking servo loop and outputs a jump pulse as the above-mentioned tracking drive signal TD in response to a track jump instruction from a controller 13 mentioned later, so that track jump operation is performed. Moreover, after the track jump as above or the like, the servo circuit 7 is configured also to perform pull-in control for turning on the tracking servo loop and performing the tracking servo control again. Notably, a configuration for pull-in of the tracking servo in the servo circuit 7 is again described later.

Moreover, the servo circuit 7 generates a sled drive signal SD on the basis of access execution control by the controller 13 and drives a sled mechanism SLD in the figure. The sled mechanism SLD, whose details are omitted in the figure, is configured to has a mechanism constituted of a main shaft holding the optical pickup OP, a sled motor, transmission gears and the like and to drive the sled motor in response to the sled drive signal SD, so that the optical pickup OP undergoes necessary sliding movement. Moreover, the servo circuit 7 is also configured to generate a sled error signal SE obtained as a low frequency component of the tracking error signal TES and to generate and output the sled drive signal SD based on the sled error signal SE, so that so-called sled servo control is performed.

The playback signal RF generated by the matrix circuit 6 is inputted to a PLL (Phase Locked Loop) circuit 12 which generates system clock SCL from the playback signal RF. The system clock SCL generated by the PLL circuit 12 is supplied to necessary parts as operation clock.

Moreover, the playback signal RF generated by the matrix circuit 6 is branched and also supplied to an equalizer (EQ) 8. Then, the playback signal RF having undergone waveform forming by the equalizer 8 is supplied to a Viterbi (Viterbi) decoder 9. The equalizer 8 and the Viterbi decoder 9 perform binarization processing using a bit detection method based on so-called PRML (Partial Response Maximum Likelihood). Namely, the above-mentioned equalizer 8 performs the waveform forming processing such that the playback signal RF suitable for a PR class of the Viterbi decoder 9 is obtained. Then, the Viterbi decoder 9 performs the bit detection based on a Viterbi detection method on the basis of the playback signal RF thus having undergone the waveform forming, so that a playback data signal (binarization signal) DD is obtained.

The playback data signal DD obtained by the Viterbi decoder 9 is inputted to a demodulator 10. A modulator 10 performs processing of demodulating the playback data signal DD obtained as RLL(1,7)PP (Parity preserve/prohibit; RLL: Run Length Limited) modulated data. Then, the data thus having undergone RLL(1,7)PP demodulation is supplied to an ECC block 11 to undergo error correction processing, deinterleave processing and the like. Thereby, playback data on the data recorded in the optical disc D is obtained.

The controller 13 is configured, for example, of a microcomputer including a CPU (Central Processing Unit), a ROM (Read Only Memory), a RAM (Random Access Memory) and the like and entirely controls the playback device 1, for example, by executing processing according to a program stored in a predetermined storage device such as the ROM. For example, the controller 13 performs the track jump instruction as mentioned above and causes the servo circuit 7 to execute operation for realizing the track jump operation. Moreover, when data to be recorded at a predetermined address in the optical disc D, for example, is to be read out, it targets the address and performs seek operation control with respect to the servo circuit 7. Namely, it instructs and causes the servo circuit 8 to execute targeting of the predetermined address and movement of the beam spot formed by the optical pickup OP.

1-2. Configuration of Tracking Error Signal Generation System

Figure 3:
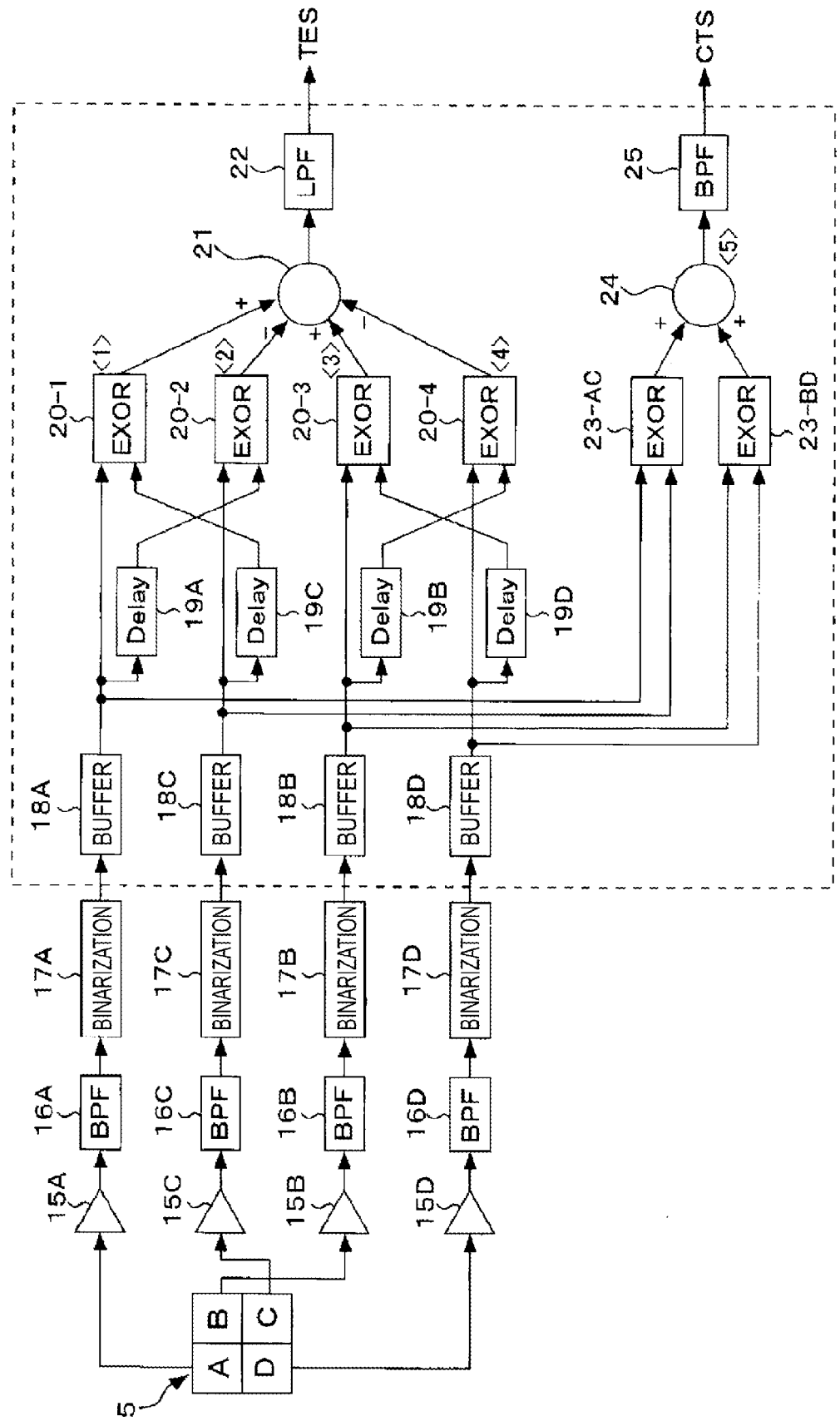
FIG. 3 is a block diagram mainly illustrating a configuration of a generation system of a tracking error signal included in an optical recording medium drive device according to a first embodiment.

Succeedingly, a configuration of a generation system, in particular, of the tracking error signal TES in the matrix circuit 6 illustrated in FIG. 1 is described using a block diagram of FIG. 3. Notably, in FIG. 3, a generation system, of the cross track signal CTS, which is formed in the matrix circuit 6 is also illustrated along with the quadruple detector 5 illustrated in FIG. 1.

In the matrix circuit 6, the generation system of the tracking error signal TES is configured to include I/V conversion amplifiers 15A to 15D, BPFs (band-pass filter) 16A to 16D, binarization circuits 17A to 17D, buffers 18A to 18D, delay circuits 19A to 19D, EXOR (EX-OR: EXclusive OR) circuits 20-1 to 20-4, an operation unit 21 and a LPF (low-pass filter) 22 in the figure. The generation system of the cross track signal CTS shares the I/V conversion amplifiers 15A to 15D, the BPFs 16A to 16D, the binarization circuits 17A to 17D and the buffers 18A to 18D with the generation system of the tracking error signal TES and further includes an EXOR circuit 23-AC, an EXOR circuit 23-BD and a BPF 25.

In FIG. 3, a light reception signal from the detector A is inputted to the I/V conversion amplifier 15A. Similarly, a light reception signal from the detector B is inputted to the I/V conversion amplifier 15B, one from the detector C to the I/V conversion amplifier 15C, and one from the detector D is inputted to the I/V conversion amplifier 15D. These I/V conversion amplifiers 15 convert the inputted light reception signals into voltage signals.

An output signal from the I/V conversion amplifier 15A is inputted to the BPF 16A, one from the I/V conversion amplifier 15B to the BPF 16B, one from the I/V conversion amplifier 15C to the BPF 16C, and one from the I/V conversion amplifier 15D to the BPF 16D. These BPFs 16 attenuate DC components, and noise components exceeding the playback signal frequency included in the input signals.

Herein, in the embodiment, since an input signal frequency exceeding the operation clock for a synchronization circuit block (mentioned later) is allowed as mentioned later, the BPF 16 is not necessary to have an effect as an anti-aliasing filter. Moreover, as mentioned later, according to the tracking error detection technique of the embodiment, since chattering tolerance can be enhanced, EQ characteristics for enhancing the amplitude of a short mark length signal to prevent chattering.

An output signal from the BPF 16A is inputted to the binarization circuit 17A, an output signal from the BPF 16B to the binarization circuit 17B, an output signal from the BPF 16C to the binarization circuit 17C, and an output signal from the BPF 16D to the binarization circuit 17D. These binarization circuits 17 include comparators and perform binarization for the input signals. Notably, in the case of the embodiment, the comparators included in the binarization circuits 17 are not necessary to employ hysteresis comparators for suppressing the chattering.

Hereafter, a binarization signal obtained by the binarization circuit 17A is represented by "signal A" and a binarization signal obtained by the binarization signal 17B is represented by "signal B". Similarly, a binarization signal obtained by the binarization circuit 17C is represented by "signal C" and a binarization signal obtained by the binarization signal 17D by "signal D".

Herein, the block which is surrounded by the broken line in the figure and is downstream of the binarization circuits 17 is a synchronization circuit block which operates according to the common operation clock.

The signal A from the binarization circuit 17A is inputted to the buffer 18A, the signal B from the binarization circuit 17B to the buffer 18B, the signal C from the binarization circuit 17C to the buffer 18C, and the signal D from the binarization circuit 17D to the buffer 18D. These buffers 18 perform buffering for synchronization.

The signal A having passed through the buffer 18A is inputted to the EXOR circuit 20-1 and also inputted to the EXOR circuit 20-2 via the delay circuit 19A. Moreover, the signal C having passed through the buffer 18C is inputted to the EXOR circuit 20-2 and also inputted to the EXOR circuit 20-1 via the delay circuit 19C. Namely, the undelayed signal A and the delayed signal C are inputted to the EXOR circuit 20-1 and the delayed signal A and the undelayed signal C are inputted to the EXOR circuit 20-2.

Moreover, the signal B having passed through the buffer 18B is inputted to the EXOR circuit 20-3 and also inputted to the EXOR circuit 20-4 via the delay circuit 19B. Moreover, the signal D having passed through the buffer 18D is inputted to the EXOR circuit 20-4 and also inputted to the EXOR circuit 20-3 via the delay circuit 19D. Namely, the undelayed signal B and the delayed signal D are inputted to the EXOR circuit 20-3 and the delayed signal B and the undelayed signal D are inputted to the EXOR circuit 20-4.

The EXOR circuit 20-1 calculates exclusive OR between the signal A inputted from the buffer 18A and the signal C inputted via the delay circuit 19C. Moreover, the EXOR 20-2 calculates exclusive OR between the signal A inputted via the delay circuit 19A and the signal C inputted from the buffer 18C.

The EXOR circuit 20-3 calculates exclusive OR between the signal B inputted from the buffer 18B and the signal D inputted via the delay circuit 19D. Moreover, the EXOR 20-4 calculates exclusive OR between the signal B inputted via the delay circuit 19B and the signal D inputted from the buffer 18D.

Hereinafter, the exclusive OR calculated by the EXOR circuit 20-1 is represented by <1> and the exclusive OR calculated by the EXOR circuit 20-2 by <2>. Moreover, the exclusive OR calculated by the EXOR circuit 20-3 is represented by <3> and the exclusive OR calculated by the EXOR circuit 20-4 signal by <4>.

To the operation unit 21, the signal of <1> obtained by the EXOR circuit 20-1, the signal of <2> obtained by the EXOR circuit 20-2, the signal of <3> obtained by the EXOR circuit 20-3 and the signal of <4> obtained by the EXOR circuit 20-4 are inputted. On the basis of these input signals, the operation unit 21 calculates "difference between a sum of <1> and <3> and a sum of <2> and <4>". Specifically, it calculates:

(<1>+<3>)−(<2>+<4>)

The signal obtained with the calculation by the operation unit 21 is outputted via the LPF 22 as the above-mentioned tracking error TES.

Moreover, in this example, the cross track signal CTS is also generated along with the tracking error signal TES. Specifically, the cross track signal CTS is generated using the outputs from the buffers 18A to 18D.

The output signal from the buffer 18A and the output signal from the buffer 18C are inputted to the EXOR circuit 23-AC and the output signal from the buffer 18B and the output signal from the buffer 18D are inputted to the EXOR circuit 23-BD.

The EXOR circuit 23-AC calculates exclusive OR between the signal A inputted from the buffer 18A and the signal C inputted from the buffer 18C and the EXOR circuit 23-BD calculates exclusive OR between the signal B inputted from the buffer 18B and the signal D inputted from the buffer 18D. The exclusive OR from the EXOR circuit 23-AC and the exclusive OR from the EXOR circuit 23-BD are inputted to an operation unit 24.

The operation unit 24 calculates a sum of the exclusive OR obtained by the EXOR circuit 23-AC and the exclusive OR obtained by the EXOR circuit 23-BD. The sum, of these pieces of exclusive OR, obtained by the operation unit 24 is outputted via the BPF 25 as the cross track signal CTS.

Notably, hereinafter, the sum signal calculated by the operation unit 24 (signal of the sum of the exclusive OR between the signal A and signal C and the exclusive OR between the signal B and the signal D) is represented by <5>.

Herein, the operation clock in the tracking error signal generation system according to the embodiment (similarly in the cross track signal generation system) is described. In the embodiment, clock asynchronous to channel clock is used as the operation clock for the generation systems of the tracking error signal and the cross track signal. Moreover, its frequency can be configured to be lower than that of the channel clock as long as it satisfies the conditions mentioned later.

Figure 4:
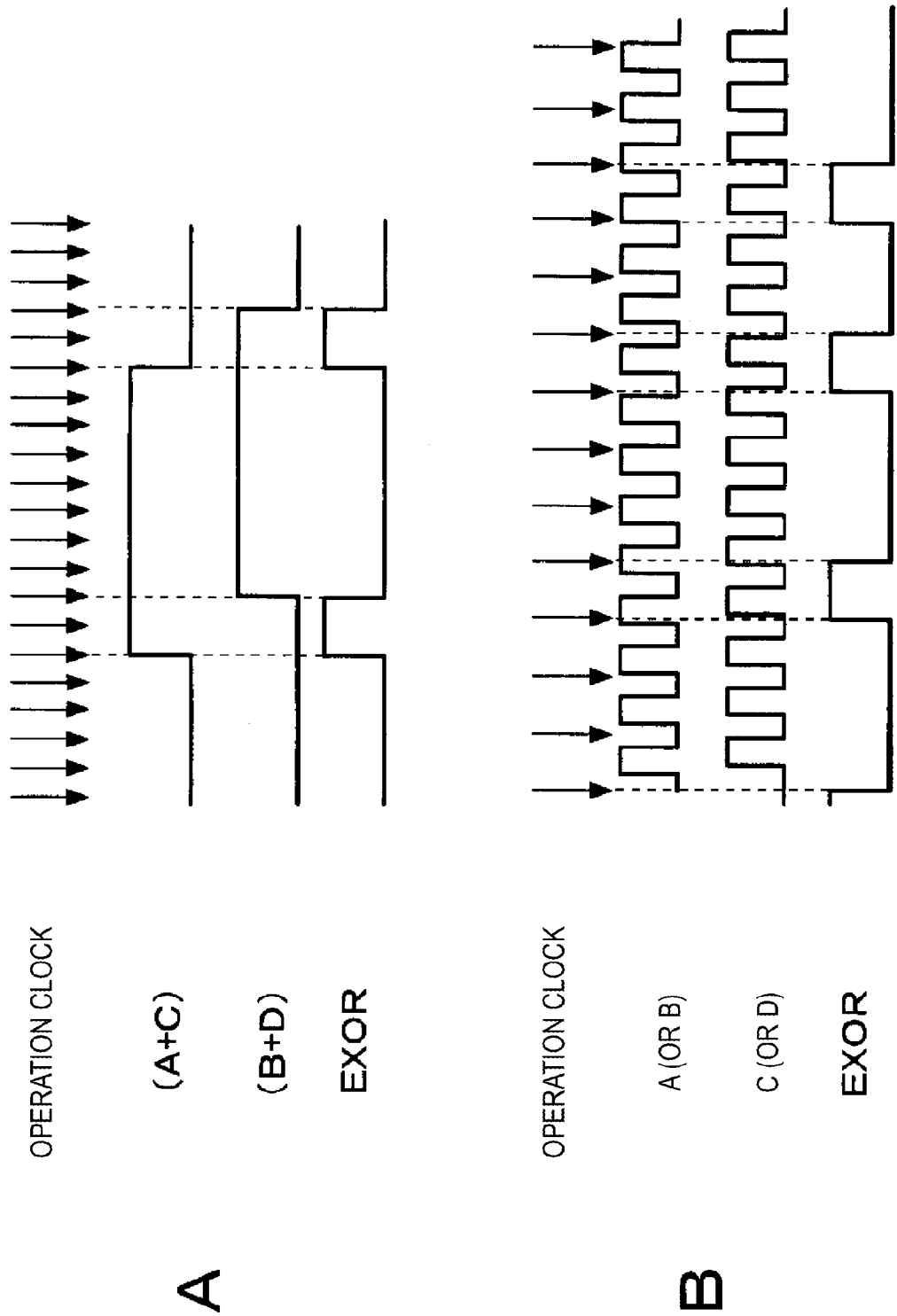
FIG. 4 is a drawing in which operation of a conventional EXOR phase comparator (FIG. 4A) is compared with operation of an EXOR circuit according to the embodiment (FIG. 4B).

FIG. 4 is a diagram for comparing operation of a conventional EXOR phase comparator (FIG. 4A) with operation of the EXOR circuit according to the embodiment (FIG. 4B). First, in the case of the conventional EXOR phase comparator illustrated in FIG. 4A, it operates at a relatively high frequency approximately same as that of the channel clock and detects a phase difference between the signal (A+C) and the signal (B+D) using an EXOR circuit.

The conventional phase comparator as above affords, as an output from the EXOR circuit, a signal whose pulse width changes depending on an error amount from the track center, so to speak, which has characteristics in a PWM (Pulse Width Modulation) manner.

On the other hand, in the case of the embodiment, as illustrated in FIG. 4B, the operation clock is asynchronous to the channel clock, and in this example, its frequency is configured to be far lower than that of the channel clock. FIG. 4B illustrates relationship among the operation clock of the synchronization circuit block (broken line part) illustrated in FIG. 3, examples of waveforms of the signal A (or the signal B) and the signal C (or the signal D), and the exclusive OR between these (output signal from the EXOR circuit 23: delay by the delay circuit 19 not taken into consideration). The output from the EXOR circuit in the case of the embodiment is ideally "0" since the phases of the two input signals coincide with each other when the beam spot is at the track center (is not "0" in reality since an offset between the input signals due to the increased recording density arises as mentioned later). On the other hand, in the case of the beam spot shifted from the track center, a phase difference arises between the input signals and is detected in timing based on the operation clock, this allowing the output from the EXOR circuit to be "1". Here, even when asynchronous operation clock is used, a probability of the phase difference between the input signals being detected is higher as the error from the track center is larger. As a result, the frequency of the output signal from the EXOR circuit being "1" increases more as the error from the track center is larger. In other words, the frequency of the output from the EXOR circuit being "0" increases more as the error from the track center is smaller.

As above, while the conventional phase comparator presents characteristics in a PWM manner, a signal whose pulse density changes depending on an error amount from the track center, so to speak, which has characteristics in a PDM (Pulse Density Modulation) manner is obtained in the embodiment.

1-3. Tracking Error Signal in Embodiment

The tracking error signal TES according to the embodiment will be hereafter described on the basis of the above-mentioned premise. First, the cross track signal CTS is described for understanding of the tracking error signal TES according to the embodiment.

As understood on the basis of the description above, the cross track signal CTS is a signal corresponding to the sum of the exclusive OR between the signal A inputted from the buffer 18A and the signal C inputted from the buffer 18C and the exclusive OR between the signal B inputted from the buffer 18B and the signal D inputted from the buffer 18D. In other words, it corresponds to the sum of the exclusive OR between the undelayed signal A and signal C and the exclusive OR between the undelayed signal B and signal D.

Here, the tracking error signal TES according to the embodiment is a signal corresponding to a difference between the "sum of the exclusive OR between the A signal without delay and the C signal with delay and the exclusive OR between the B signal without delay and the D signal with delay" as "<1>+<3>" and the "sum of the exclusive OR between the A signal with delay and the C signal without delay and the exclusive OR between the B signal with delay and the D signal without delay" as "<2>+<4>" mentioned above.

Taking this into consideration, it is known that the cross track signal CTS corresponds to an exclusion of the delay from the signals in "<1>+<3>" and "<2>+<4>" which constitute the tracking error signal TES.

Figure 5:
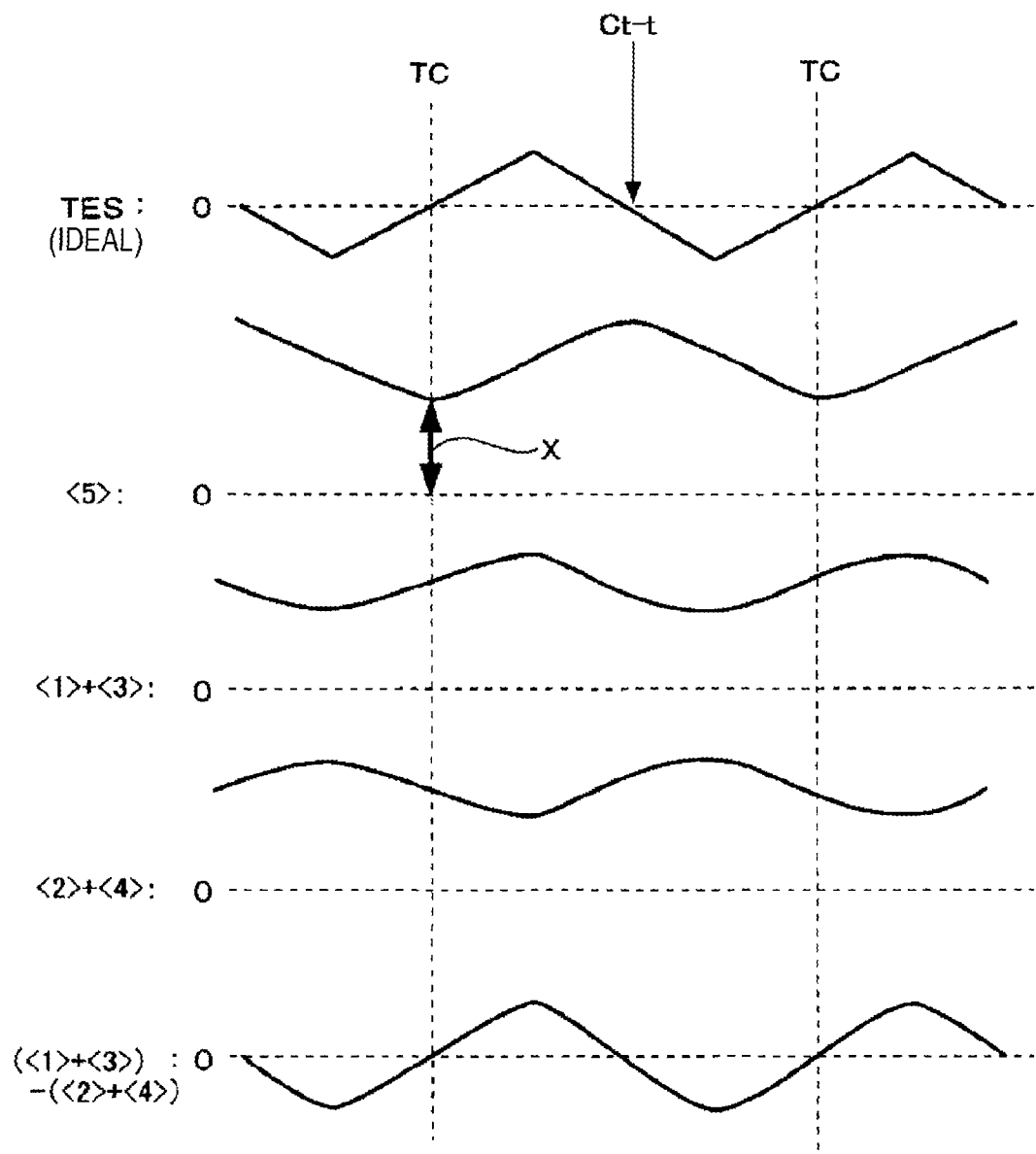
FIG. 5 is a drawing illustrating images of waveforms of signals generated according to the embodiment.

Here, FIG. 5 illustrates images of waveforms of the signals which are formed in the embodiment, including the signal (<5>) of the "sum of the exclusive OR between the signals A and C and the exclusive OR between the signals B and D" corresponding to the cross track signal CTS. Specifically, FIG. 5 illustrates individual images for a waveform of the tracking error signal TES (ideal waveform), a waveform of the signal of <5>, a waveform of the signal of "<1>+<3>", a waveform of the signal of "<2>+<4>" and a waveform of the signal of (<1>+<3>)−(<2>+<4>) in the order from the top, the waveforms obtained in the occasion of the beam spot shifted in the radial direction of the optical disc D. Notably, the waveforms of the signals of <5>, "<1>+<3>", "<2>+<4>" and (<1>+<3>)−(<2>+<4>) in the figure represent respective averaged waveforms.

First, as a premise, an ideal tracking error signal TES is a signal whose amplitude level oscillates positively/negatively in a direction away from the track center (represented by TC in the figure), which is the reference, as it is away therefrom as illustrated in the topmost stage of the figure. Here, it is supposed that it is ideal that, while the tracking error signal TES crosses the zero level also at the middle point between the track centers CT (represented by Ct-t in the figure), the track center CT undergoes zero cross from negative to positive, and conversely, the middle point Ct-t undergoes zero cross from positive to negative in the description here.

As illustrated in the figure, the signal of <5> corresponding to the cross track signal CTS tends to take its minimum value at the track center CT, to take its maximum value at the middle point Ct-t, and to take a larger amplitude as an error from the track center CT becomes larger. Only in terms of its phase, the signal of <5> above is in the relation of shifting by 90 degrees (advancement by 90 degrees) relative to the tracking error signal TES.

Herein, attention is paid to the track center CT in regard to the signal of <5>. When ideal binarization signals (signals A, B, C and D) with no influence of deterioration due to the increased recording density and the like are obtained, the amplitude level should be "0" since these signals are the same signals at the track center CT. The signal of <5> however is not precisely "0" still at the track center CT in reality due to the influence of binarization signal deterioration such as the chattering, pulse width fluctuation and local signal deficiency mentioned above, this causing a DC offset represented by "X" in the figure. The level of the offset X increases or decreases in accordance with the degree of deterioration of the binarization signals.

Moreover, the bottom part of the signal of <5> has a shape of a pan bottom due to such influence of deterioration of the binarization signals and due to the influence of the signals of A+C and B+D having a phase difference. Therefore, even if it is assumed that a technique for calculating a minimum level of the signal of <5> is employed, the track center CT cannot be detected precisely. In other words, the cross track signal CTS is exceedingly difficult solely to contribute proper tracking error detection.

In order to obtain the ideal tracking error signal TES, it is sufficient that the phase of the signal of <5> is delayed by 90 degrees and the offset X thereof is removed therefrom. Accordingly, in the embodiment, the signals of "<1>+<3>" in which the signal C and the signal D are delayed and "<2>+<4>" in which the signal A and the signal B are delayed, the signals A and C and the signals B and D constituting the signal of <5>, are generated and (<1>+<3>)−(<2>+<4>) which is the difference between these is calculated.

Herein, as apparent from referring to FIG. 2 above, the signals C and D are signals from the detectors arranged downstream and the signals A and B are signals from the detectors arranged upstream. Taking this into consideration, it is known that the signal of "<1>+<3>" is a signal in which the downstream signals C and D regarding the signal of <5> are delayed and that "<2>+<4>" is one in which the upstream signals are delayed.

When the downstream signals, constituting the same signal of <5>, are delayed, the phase of the same can be delayed by an amount according to delay time. On the other hand, when the upstream signals are delayed, the phase can be advanced by the amount according to the delay time. Properly configuring this delay time allows a signal having the phase of the signal of <5> delayed by 90 degrees as the signal of "<1>+<3>" to be obtained, and meanwhile, a signal having the phase of the signal of <5> advanced by 90 degrees for the signal of "<2>+<4>" to be obtained. In other words, the signal whose phase coincides with that of the ideal tracking error signal TES can be obtained as the signal of "<1>+<3>" and the signal whose phase is reverse to that of the ideal tracking error signal TES can be obtained as the signal of "<2>+<4>".

As above, in the embodiment, (<1>+<3>)−(<2>+<4>) is calculated as the difference between "<1>+<3>" and "<2>+<4>". The phase of the signal of (<1>+<3>)−(<2>+<4>) coincides with that of the ideal tracking error signal TES and the DC offset X thereof is removed as illustrated in the figure. As a result, the signal substantially same as the ideal tracking error TES can be obtained.

Herein, a delay amount (delay time) with respect to the delay circuits 19 is important for attaining the tracking error detection technique as mentioned above. The delay amount is sufficient to be configured as follows. Namely, the delay amount in this case is basically sufficient to be configured to be "time of one half of signal shift time arising between the track center CT and the middle point Ct-t". Configuring the delay time as above can attain the phase shift by 90 degrees as mentioned above.

It should be noted that the delay amount is desirable to be small depending on the degree of deterioration of the binarization signals. Specifically, it is empirically known that, when the delay amount is small, the DC offsets of the signals of "<1>+<3>" and "<2>+<4>" tend to decrease and the AC amplitudes thereof tend to increase. Therefore, taking this into consideration, the delay amount is desirable to be configured to be slightly shorter than the "time of one half of signal shift time arising between the track center CT and the middle point Ct-t".

When the operation is confirmed actually, even in the case where the delay amount fluctuates by approximately ±3 dB from the one corresponding to the "time of one half of signal shift time arising between the track center CT and the middle point Ct-t", the amplitude of the tracking error signal TES is not caused to attenuate largely. Moreover, in the case of measurement of the tracking error signal TES under twice or half the delay amount, despite large attenuation of the amplitude, the part of zero cross in the tracking error signal TES can be confirmed to be kept up on the track center CT even under such a situation.

Herein, for its confirmation, the "time of one half of signal shift time arising between the track center CT and the middle point Ct-t" is supplemented. First, as a premise, when the beam spot is at the middle point Ct-t between the track centers CT, the phase difference between the signal (A+C) and the signal (B+D) is at its maximum. The phase difference in this stage is placed to be a maximum phase difference Amax. How much approximated value the maximum phase difference A max has can be calculated on the basis of optical conditions such as the track pitch, spot size, rotational velocity (linear velocity) and linear density of the optical disc D and the like (see Reference Literature 1 below).

Reference Literature 1: JP H7-296395A

The "time of one half of signal shift time arising between the track center CT and the middle point Ct-t" means time corresponding to ½ of the maximum phase difference Amax. For example, in the case of the BD, the track pitch is approximately 320 nm and thus the distance between the track center CT and the middle point Ct-t is approximately 160 nm. When the signal phase difference (signal shift time) between the signal (A+C) and the signal (B+D) arising corresponding to this 160 nm of erroneous tracking is known, the time length of one half thereof is approximately to be the delay time which should be configured. Assuming that the maximum phase difference Amax is approximately 2T, the delay time is sufficient to be configured to be 1T, which is one half thereof.

Notably, in the embodiment, the delay circuit 18 is configured to operate according to the above-mentioned operation clock. In this case, as the conditions which the operation clock is needed to satisfy, it should be asynchronous to the channel clock as mentioned above, and further in addition, the condition that the delay amount based on the "time of one half of signal shift time arising between the track center CT and the middle point Ct-t" can be attained is needed.

By the way, as understood on the basis of the description above, in the embodiment, a signal having characteristics in a PDM manner is obtained as (<1>+<3>)−(<2>+<4>) calculated by the operation unit 21. It is important for improvement of precision of tracking error detection that the LPF 22 illustrated in FIG. 3 performs proper LPF processing on the signal having characteristics in a PDM manner.

Herein, providing the LPF 22 allows an integration effect on phase relation information extracted in a PDM manner as above. As a result, the influence of errors included in the individual pulses on the tracking error signal TES can be reduced, this allowing accurate tracking error detection.

The band of the LPF 22 should be configured to be at least lower than the band having an anti-aliasing effect with respect to the operation clock of the downstream block (servo circuit 7) which actually performs the servo control. In this stage, the LPF band may be configured to be further lower within a range where the necessary servo band is obtained. Thereby, the integration effect can be enhanced and the tracking error signal TES can be obtained in higher quality.

Notably, the LPF 22 is desirable to be implemented, its bit precision taken into consideration, such that the influence of rounding error is small in order to reflect all the information of the input signals correctly on the signal after the LPF processing. As an actual result of confirmation of the operation under the conditions of the BD at double-speed (132 MHz of channel clock) and the above-described operation clock=50 MHz, an excellent tracking error signal TES is obtained by using a bit shift LPF with 32-bit registers which can be implemented quite simply as the LPF 22.

As described as above, according to the tracking error detection technique according to the embodiment, even when pulse width fluctuation, chattering and the like arise caused by the increased recording density of the optical disc D, the influence thereof presents as a signal offset (offset X in each of the signal of the sum of <1> and <3> and the signal of the sum of <2> and <4>) and the offset is compensated in the generation process of the tracking error signal TES as mentioned above, this enabling a situation of the tracking error detection precision deteriorating caused by the pulse width fluctuation, chattering and the like to be prevented from taking place. As a result, the problems of phase detection errors pointed out in sections [a] and [b] above can be effectively prevented from taking place. In other words, stable tracking error detection can be performed on the basis of a light reception signal which deteriorates due to increased recording density.

Moreover, according to the embodiment, since high-speed operation as approximately fast as that under the channel clock is not necessary, the problem in section [c] above caused by increase of the playback signal frequency can also be prevented from taking place.

Moreover, regarding the problem, in section [d], caused by the phase differences arising between the A signal and the B signal and between the C signal and D signal due to the pit depth, in the embodiment, either the signal A and the signal C or the signal B and the signal D are not added but a phase relation between the signal A and the signal C (EXOR) and a phase relation between the signal B and the signal D (EXOR) are detected and tracking error is detected using such information. By doing so, even when the phase differences caused by the pit depth arise between the signal A and the signal B and between the signal C and the signal D, the tracking error can be detected properly.

Notably, it should be confirmed that, also similarly for the cross track signal CTS, either the signal A and the signal C or the signal B and the signal D are not added but a phase relation between the signal A and the signal C (EXOR) and a phase relation between the signal B and the signal D (EXOR) are individually detected and the signal is generated. Hence, signal error caused by the pit depth can be prevented.

Herein, from among DPD (Differential Phase Detection) detection circuits, there are some using a digital phase shifter. The phase shifter shifts a phase in accordance with an input signal frequency. For attaining this, the period of the input signal is necessary to be detected accurately. A high-density optical disc suffers phenomena such as chattering, pulse width fluctuation and local pulse deficiency in high frequency, this also causing faulty operation of the phase shifter in high frequency.

On the contrary, in the embodiment, although processing similar to the phase shift is performed in generating the signals of "<1>+<3>" and "<2>+<4>", it is configured to be attained by the delay circuit 18. Accordingly, in the embodiment, a phase shifter is not necessarily used. Hence, such a problem caused by the phase shifter does not arise. Notably, as mentioned above, the delay time according to the embodiment is determined from various conditions such as the laser spot diameter, track pitch, linear density and multiple speed. Therefore, dynamic control in response to the input signal as in the case of using the phase shifter is not necessary.

Moreover, some recent DPD detection circuits perform conversion of signals A to D into individual digital data with multi-bit ADCs (A/D converters) for succeeding processing. In such a system, only one high-speed ADC used for a read channel in a typical optical disc drive control LSI (integrated circuit) and two to four high-speed ADCs having the same performance dedicated for tracking signal generation are necessary to be mounted, this resulting in increase of the chip area of the LSI, increase of the power consumption and increase in costs.

On the contrary, in the embodiment, digital conversion with ADCs for the signals A to D is not necessary in particular, this enabling such problems to be prevented from taking place.

Moreover, there are some DPD detection systems using an analog AGC (Auto Gain Control) amplifier such that the amplitudes of the signals A to D are allowed to coincide with one another, for example, in the case of using multiplier-type phase comparators. Moreover, there is a system using two to four peak/bottom holding circuits that perform level detection of the input signals in order to configure a proper hysteresis level all the time in the case of employing hysteresis comparators for suppressing chattering in the binarization signals. The analog circuits used in these systems occupy a large area in the optical disc LSI chip being small and their power consumption is relatively large. In order to allow the circuits to operate at high speed in high precision, their designing can be caused to be difficult.

On the contrary, in the embodiment, any analog AGC amplifiers or hysteresis comparators as above are not necessary, this enabling the problems above to be prevented from taking place.

1-4. Method of Using Cross Track Signal

Succeedingly, a method of using the cross track signal CTS is described. Herein, as mentioned above, two zero cross points present in the tracking error signal TES for each period. Among these, a tracking servo can be stably applied at one zero cross point representing the actual track center CT (zero cross point from negative to positive in the example of FIG. 5).

When a direction in which the beam spot crosses the track is not definite, however, which zero cross point represents the real track center CT cannot be determined only on the basis of the tracking error signal TES.

As apparent from referring to FIG. 5 above, the cross track signal CTS is the signal whose amplitude is at its minimum only at the track center CT. Using this nature allows the cross track signal CTS to be used for determination of affirmative or negative of the track center CT to be real.

Specifically, in the example, the cross track signal CTS undergoes binarization. In a section of the cross track signal CTS having undergone binarization to be "0", it is determined that the zero cross point obtained in the tracking error signal TES represents the real track center CT. Conversely, in a section of being "1", it is determined that the zero cross point obtained in the tracking error signal TES is not the real track center CT.

In the example, there is exemplarily presented a case where such determination processing is performed correspondingly, for example, in the occasion of pull-in of the tracking servo.

Figure 6:
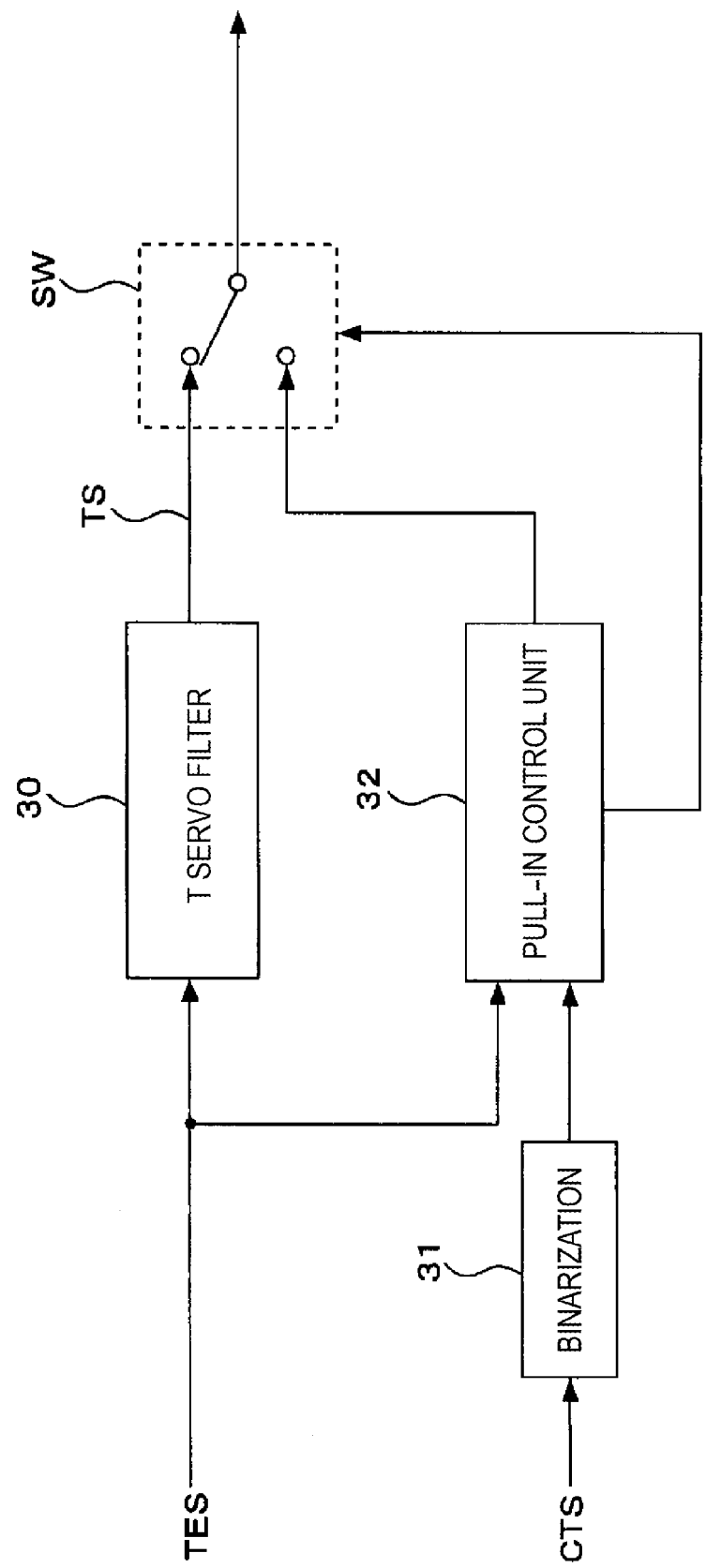
FIG. 6 is a block diagram for explaining a configuration for attaining pull-in control of a tracking servo using a cross track signal.

FIG. 6 is a block diagram for explaining a configuration for attaining pull-in control of the tracking servo using the cross track signal CTS. First, the tracking error signal TES outputted from the LPF 22 illustrated in FIG. 3 above is inputted to a T servo filter 30 (T being an abbreviation of tracking) provided in the servo circuit 7. The T servo filter 30 performs filtering, loop gain processing and the like for phase compensation and the like as mentioned above to generate the tracking servo signal TS. As in the figure, the tracking servo signal is inputted to a switch SW.

Moreover, the tracking error signal TES is also inputted to a pull-in control unit 32 in the figure. The cross track signal CTS from the BPF 25 illustrated in FIG. 3 above has undergone binarization in a binarization circuit 31 in the figure to be inputted to the pull-in control unit 32. The pull-in control unit 32 realizes pull-in of the tracking servo by selecting the switch SW. The pull-in control unit 32 in this case is also configured to perform output of the jump pulse for a track jump and output of the braking pulse. These output pulses are inputted to the switch SW.

The pull-in control unit 32 performs pull-in control on the basis of the tracking error signal TES and the cross track signal CTS after binarization. Specifically, the pull-in control unit 32 monitors the amplitude of the tracking error signal TES and the cross track signal CTS after binarization. It causes the switch SW to select the tracking servo signal TS when the conditions are satisfied that zero cross of the tracking error signal TES arises and the cross track signal CTS after binarization is "0" (is at Low level). In other words, in response to the state where it is considered that zero cross of the tracking error signal TES arises corresponding to the middle point Ct-t between the track centers and the beam spot position is in the vicinity of the track center CT, pull-in of the tracking servo is caused to be performed. In such a configuration, stable pull-in of the tracking servo is possible.

Herein, such control is performed, for example, as pull-in of the tracking servo after the sled mechanism SLD performs a long range seek in which the optical pickup OP is driven widely or pull-in of the tracking servo after pull-in of the focus servo.

Moreover, the cross track signal CTS can also be preferably used for braking control in the occasion of a track jump. Specifically, it is desirable for attaining accurate (stable) jump operation that a movement direction of the beam spot is apparent in the occasion of braking control. The cross track signal CTS can also be preferably used as a signal for determining the movement direction of the beam spot in the occasion of braking control.

Herein, as understood on the basis of the description above, it is understood that the cross track signal CTS used in the example is sufficient to be obtained under the condition of crossing the track in the occasion of pull-in of the tracking servo, in the occasion of track jump operation, and the like. In view of this, the DC component (offset X) of the signal of <5> outputted by the operation unit 24 is sufficient only to be cut by the above-mentioned BPF 25. Notably, if necessary, an offset subtracter circuit may be provided in place of the BPF 25 to generate the cross track signal CTS in which the DC component (offset X) is maintained.

2. Second Embodiment

As understood on the basis of the description above, the delay time to be given the signals A to D in the embodiment should be configured such that its time length is according to the track pitch, spot size, rotational velocity (linear velocity) of the optical disc D, linear density thereof and the like. In view of this, the delay time is desirable to be able to be variably configured in accordance with the media kind of the optical disc D (for example, discrimination of BD, DVD, CD or the like), and in accordance with the linear velocity even in the case of the same media kind. Therefore, in a second embodiment, a configuration in which the delay time is variably configured is proposed.

Figure 7:
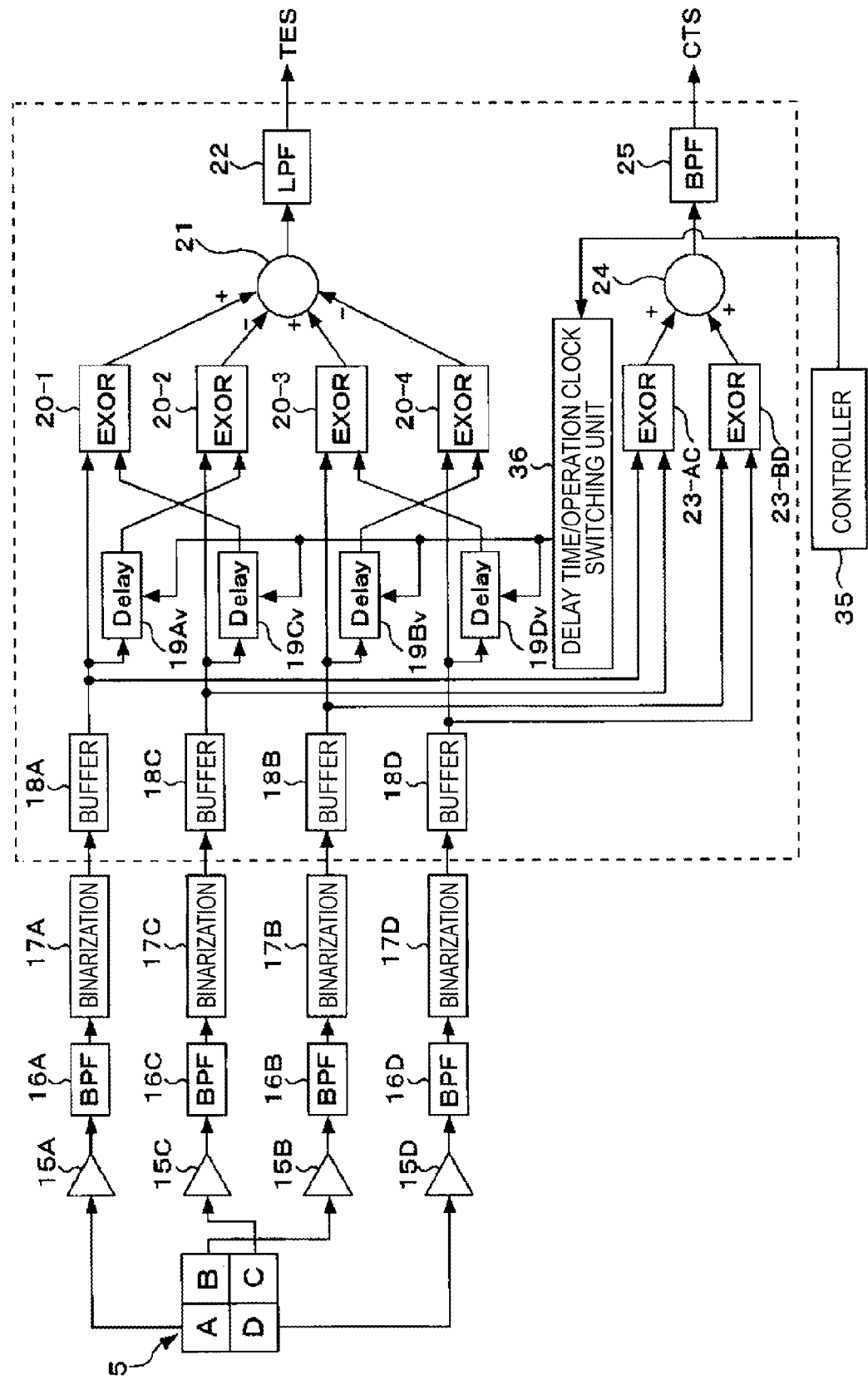
FIG. 7 is a block diagram mainly illustrating a configuration of a generation system of the tracking error signal included in an optical recording medium drive device according to a second embodiment.

FIG. 7 is a block diagram illustrating a configuration of the tracking error signal generation system (including the cross track signal generation system) that is as the second embodiment. Notably, in FIG. 7, the parts that are same as the parts having been already described above are provided with the same signs and their description is omitted. Also in this case, the entire configuration of the playback device (excluding a controller 13) is similar to that illustrated in FIG. 1.

Figure 8:
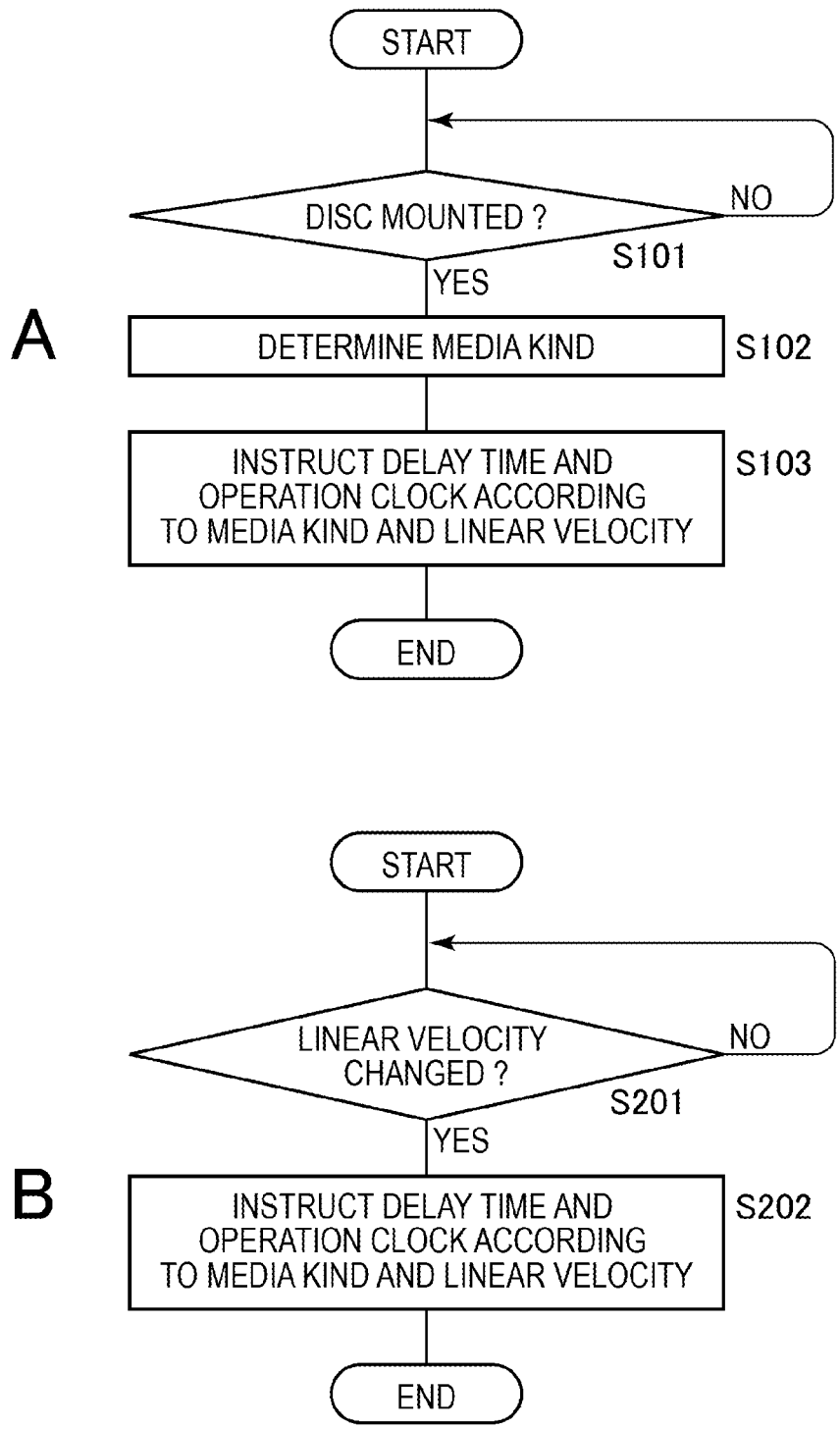
FIG. 8 illustrates flowcharts of specific processing procedures for switching delay time/operation clock.

As apparent from its comparison with FIG. 3 above, the configuration of the tracking error signal generation system according to the second embodiment is different from the tracking error signal generation system, according to the first embodiment, being compared therewith in providing delay circuits 19Av, 19Bv, 19Cv and 19Dv whose delay time is variable in place of the delay circuits 19A, B, C and D and in adding a delay time/operation clock switching unit 36. Moreover, in this case, a controller 35 is provided to perform processing illustrated in FIG. 8 below in place of the controller 13.

Herein, in the example, the delay time/operation clock switching unit 36 also performs switching of the operation clock (operation clock of the synchronization circuit block indicated by the broken line) as well as the delay time. A method may be considered that clock in a frequency corresponding to the fastest multiple speed that the playback device can handle is configured as the operation clock. There however is a case to be desirable where the operation clock is optimized in power consumption of digital circuits when it is configured in accordance with the multiple speed. Taking this into consideration in this example, switching of the operation clock is also configured to be performed.

The delay time/operation clock switching unit 36 configures the delay time of the delay circuits 19Av to 19Dv and the operation clock in response to the instruction from the controller 35.

Specific processing procedures for switching of the delay time/operation clock by the controller 35 are described using flowcharts illustrated in FIG. 8A and FIG. 8B. FIG. 8A illustrates an exemplary processing procedure to be performed in accordance with mounting of the optical disc D. FIG. 8B illustrates an exemplary processing procedure to be performed accordingly in the case of the linear velocity changed after mounting the optical disc D.

In FIG. 8A, in step S101, the controller 35 waits for mounting of the optical disc D. Then, when the optical disc D is mounted, in step S102, determination of the media kind of the optical disc D is performed. The determination of the media kind can be performed, for example, on the basis of the result of measuring the reflectivity of the disc. Otherwise, it can be performed also on the basis of readout of identification information, of the media kind, which is recorded in the optical disc D.

After the determination of the media kind in step S102, in step S103, the delay time/operation clock switching unit 36 is instructed with the delay time and the operation clock according to the media kind and the linear velocity.

Herein, the delay time and the operation clock frequency according to the media kind and the linear velocity are configured with reference to a conversion table, the conversion table which represents relations between these being beforehand prepared. For the conversion table, the delay time which is approximately the "time of one half of signal shift time arising between the track center CT and the middle point Ct-t" mentioned above and the operation clock frequency to attain the delay time are calculated for each combination of the media kind and the linear velocity to be expected. The information in which these are associated with each other is stored in a memory that is readable of the controller 35. The controller 35 reads out the corresponding information of the delay time and the operation clock frequency from the conversion table on the basis of the information of the media kind determined in step S102 and the information of the multiple speed (linear velocity) in the occasion of playback operation going to be performed. It instructs the delay time/operation clock switching unit 36 to configure the delay time and the operation clock frequency.

In response to the instruction in step S103, the delay time/operation clock switching unit 36 configures the delay time according to the media kind and the linear velocity in the delay circuits 19Av to 19Dv and configures the operation clock according to the media kind and the linear velocity.

Next, in FIG. 8B, in step S201, the controller 35 waits for changing of the linear velocity. Then, when the linear velocity is considered to be changed, in step S202, it instructs the delay time/operation clock switching unit 36 with the delay time and the operation clock according to the media kind and the linear velocity similarly to step S103 above. Notably, it should be confirmed that the media kind has been already determined in response to the mounting of the optical disc D in step S102 of FIG. 8A above.

Notably, when a CAV (Constant Angular Velocity) method is employed as the rotation control method of the optical disc D (when a disc in a CLU format undergoes CAV playback), the processing presented in FIG. 8B is effective particularly in this case since the linear velocity always changes after the starting of playback.

3. Modifications

The embodiments according to the present technology have been described above, whereas the present technology should not be limited to the above-described specific examples. For example, while the individual parts relevant to the operations for the tracking error signal TES (and the cross track signal CTS) (buffers 18; delay circuits 19; EXOR circuits 20, 23) by way of example are configured to be caused to operate under the same operation clock, that is, caused to undergo synchronous operation in the description above. Such individual parts relevant to the operations of the signals can also be caused to operate asynchronously.

Figure 9:
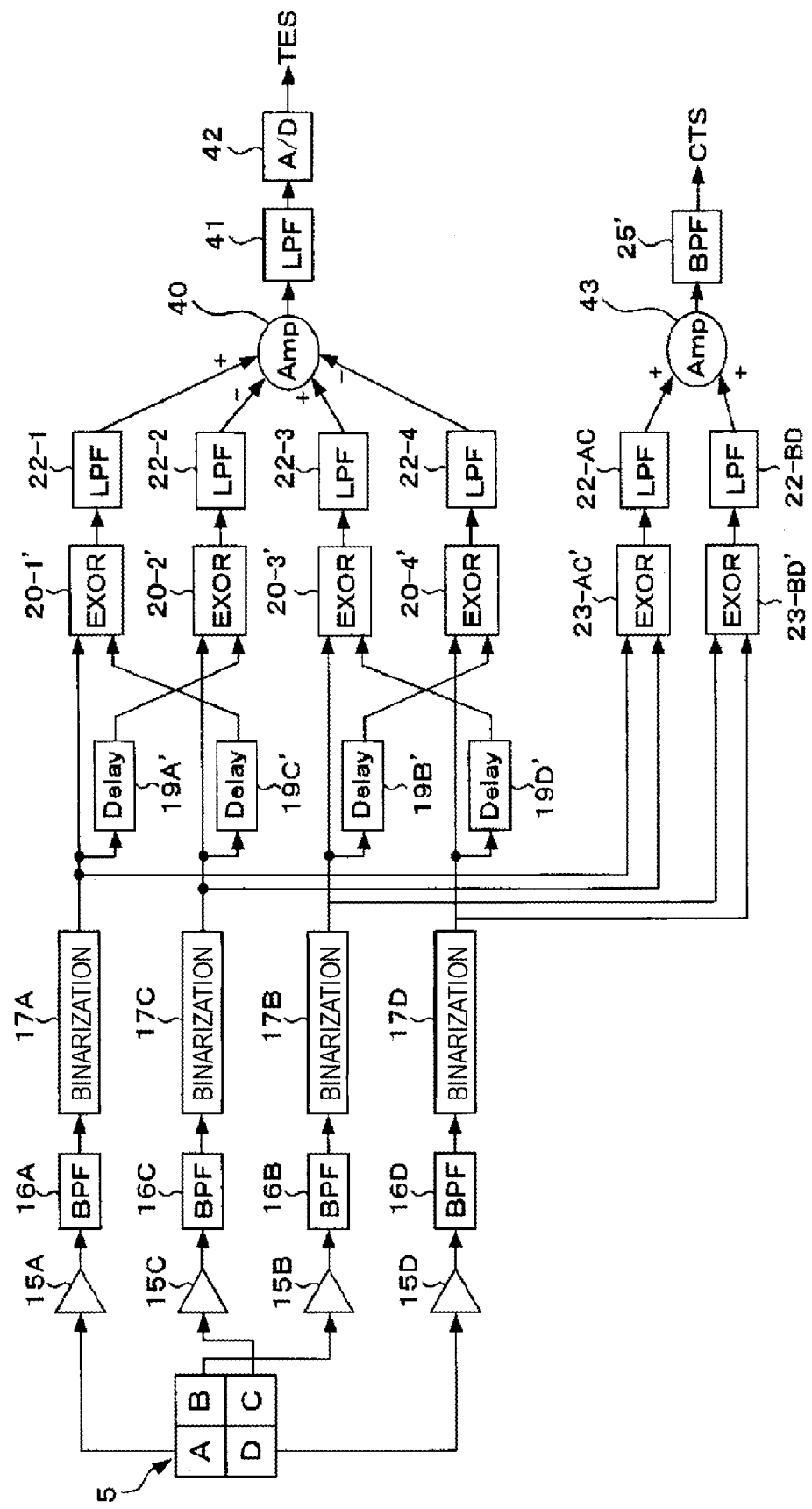
FIG. 9 is a diagram illustrating exemplary implementation in an asynchronous digital circuit.
Figure 10:
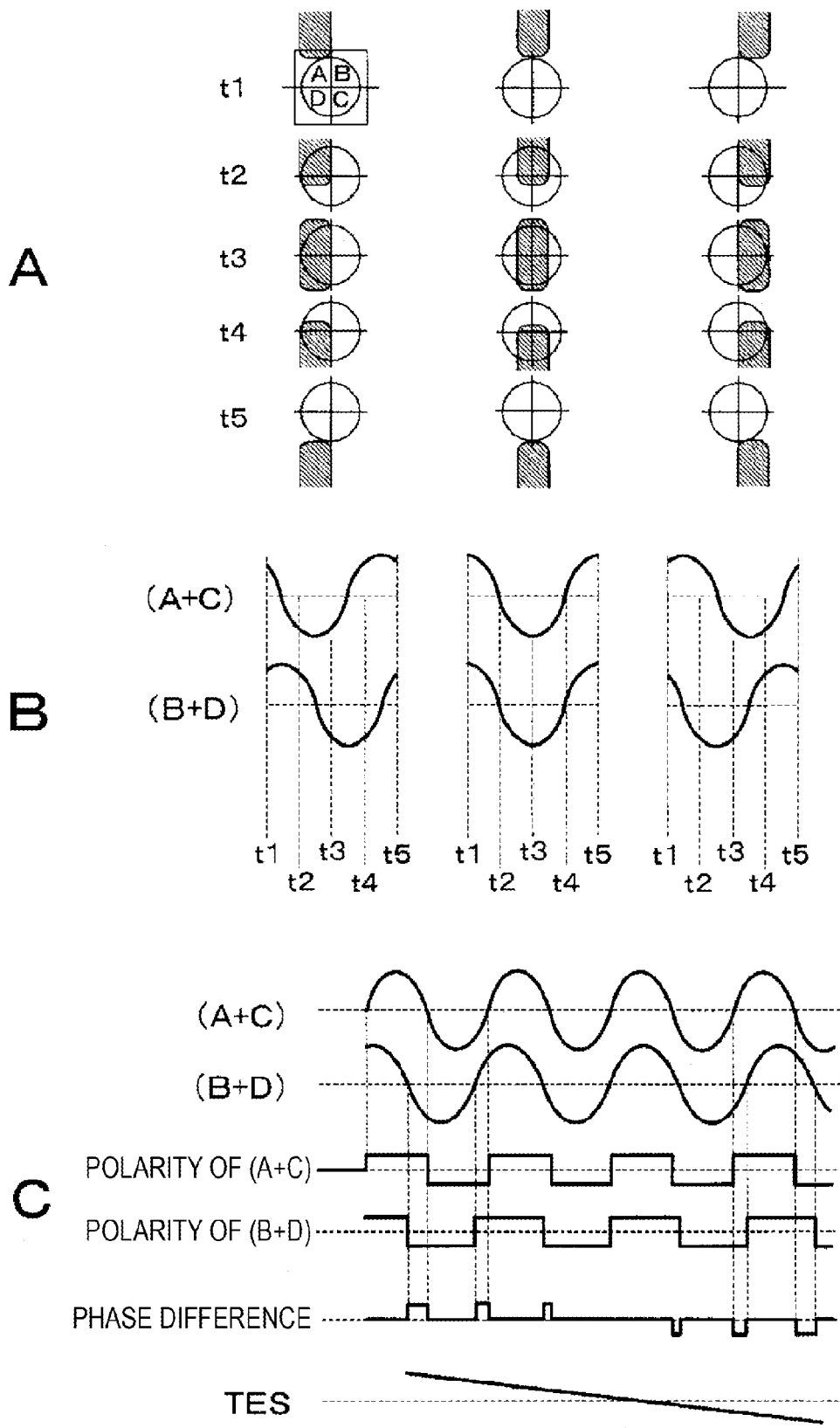
FIG. 10 is an explanatory drawing of a tracking error detection technique based on a DPD scheme.
Figure 11:
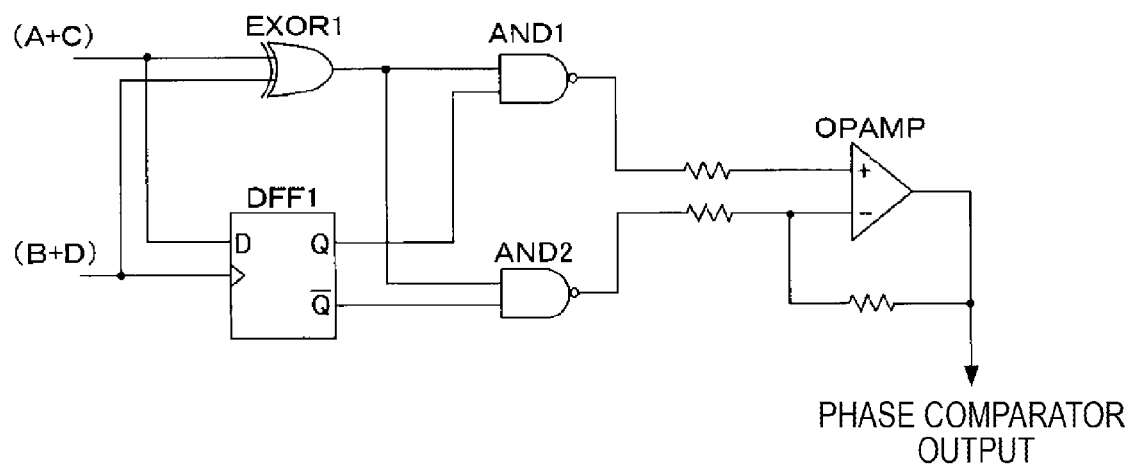
FIG. 11 is a diagram exemplarily illustrating a conventional phase comparator.
Figure 12:
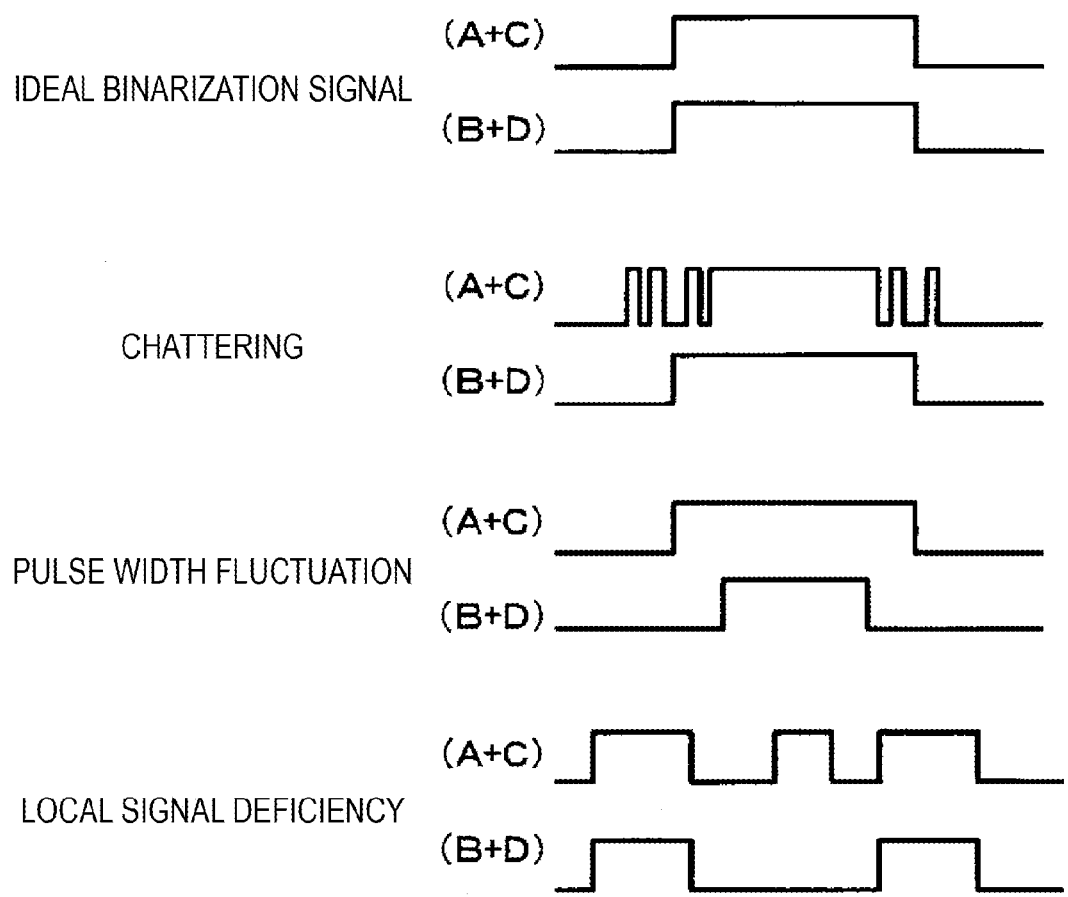
FIG. 12 is an explanatory drawing of specific modes of signal deterioration due to the increased recording density of an optical disc.
Figure 13:
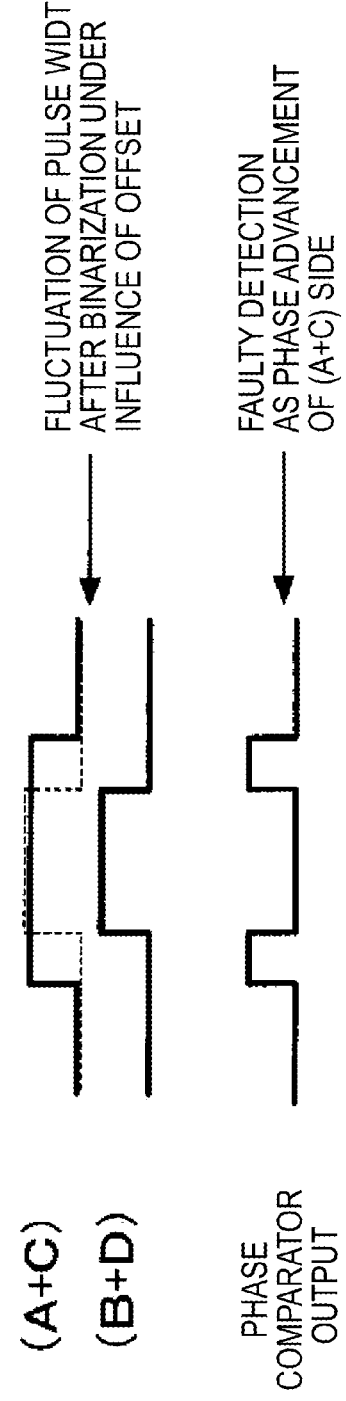
FIG. 13 is an explanatory drawing of a phase detection error caused by pulse width fluctuation.
Figure 14:
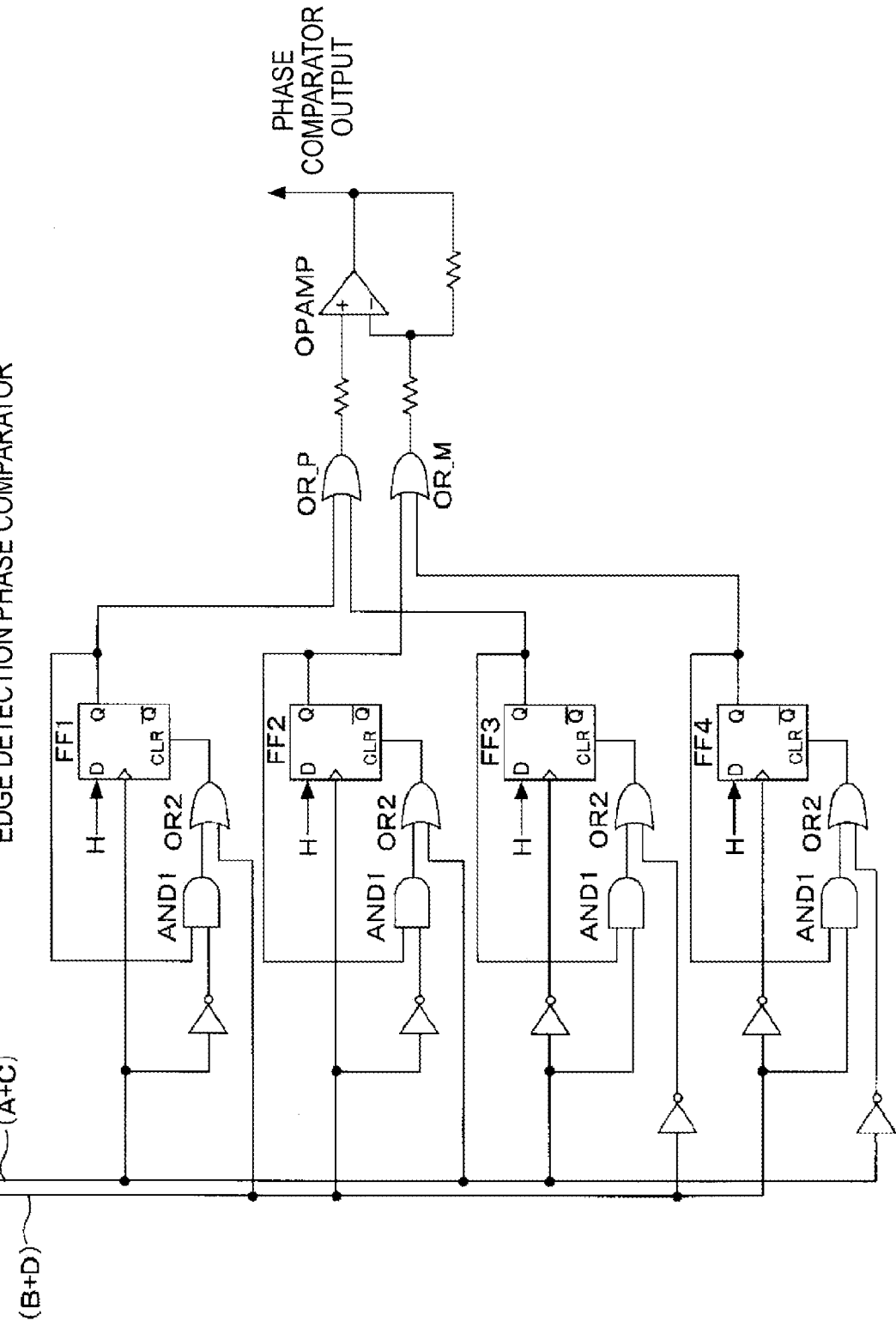
FIG. 14 is an explanatory drawing of an edge detection phase comparator.
Figure 15:
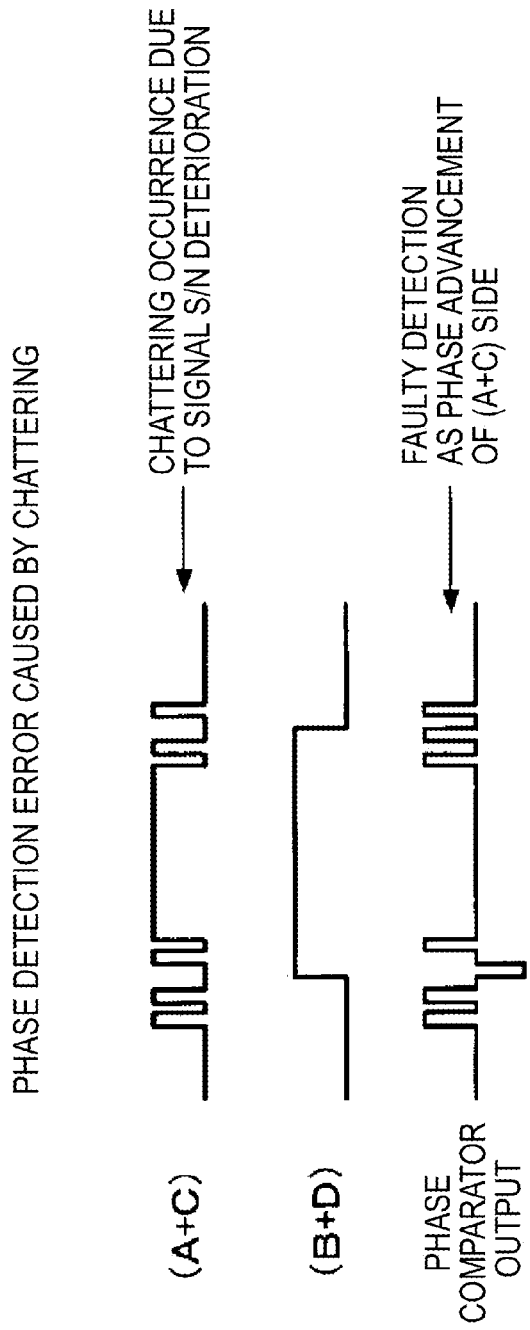
FIG. 15 is an explanatory drawing of a phase detection error caused by chattering.

FIG. 9 is a diagram exemplarily illustrating implementation in an asynchronous digital circuit. The example of the figure illustrates a case where a configuration of an operation system of the tracking error signal TES according to the embodiment is attained by a combination of asynchronous digital circuits and analog circuits. In this case, the buffers 18 for synchronization are omitted. The signal A is inputted to the EXOR circuit 20-1' and the delay circuit 19A', the signal C to the EXOR circuit 20-2' and the delay circuit 19C', the signal B to the EXOR circuit 20-3' and the delay circuit 19W, and the signal D to the EXOR circuit 20-4' and the delay circuit 19D'. The output from the delay circuit 19A' is inputted to the EXOR circuit 20-2', the output from the delay circuit 19C' to the EXOR circuit 20-1', the output from the delay circuit 19B' to the EXOR circuit 20-4', and the output from the delay circuit 19D' to the EXOR circuit 20-3'.

Moreover, in the generation system of the cross track signal CTS, the signal A and the signal C are inputted to the EXOR circuit 23-AC' and the signal B and the signal D to the EXOR circuit 23-BD'.

Herein, the EXOR circuits 21-1', 21-2', 21-3', 21-4', 23-AC' and 23-BD' output the respective pieces of exclusive OR between the input signals and have a difference in not operating under the common operation clock with those of other parts from the EXOR circuits illustrated in FIG. 3 and FIG. 7. Moreover, the delay circuits 19A', 19B', 19C' and 19D' are similar to the delay circuits 19A, B, C and D and similarly gives a predetermined amount of delay the input signals to output them. They are also different therefrom in not operating under the common operation clock with those of other parts.

In this case, outputs from the EXOR circuits 21-1', 21-2', 21-3' and 21-4' are inputted to the LPFs 22-1, 21-2, 21-3 and 21-4 as in the figure, respectively, their respective numbers at the tails corresponding to each other. The LPFs 22-1 to 22-4 perform the LPF processing similarly to that of the LPF 22 mentioned above to perform smoothing on the input signals.

Outputs from the LPFs 21-1 to 22-4 are added/subtracted in an amplifier 40 in a predetermined manner. Specifically, supposing that the output from the LPF 21-1 is <1>', the output from the LPF 21-2 is <2>', the output from the LPF 21-3 is <3>' and the output from the LPF 22-4 is <4>', the addition/subtraction (<1>'+<3>')−(<2>'+<4>') is performed to obtain a difference between "<1>'+<3>'" and "<2>'+<4>'".

An output from the amplifier 40 undergoes, in the LPF 41, LPF processing which takes account of anti-aliasing for the downstream A/D conversion, and is converted by A/D conversion in a A/D converter 42 to be outputted as the tracking error signal TES.

Moreover, on the cross track signal CTS operations side, an output from the EXOR circuit 23-AC' is inputted to the LPF 22-AC and an output from the EXOR circuit 23-BD' to the LPF 22-BD. They undergo smoothing based on the LPF processing similarly to the LPF 22 above. Then, outputs from the LPF 22-AC' and the LPF 22-BD' are added in an amplifier 43 and undergo filer processing (removal of the DC component) in a BPF 25' similarly to the BPF 25' above to be outputted as the cross track signal CTS. Notably, the cross track signal CTS is sufficient only to undergo binarization by the binarization circuit 31 in the use method described using FIG. 6 above.

Merits of the configuration illustrated in FIG. 9 include that any circuit configuration for synchronization such as the buffers 18 is not necessary, that it is similar to an implementation mode for a conventional DPD detection circuit, and that it is suitable when the tracking error signal TES (along with the cross track signal CTS) is generated with the common circuit with that for the optical disc D that is relatively low in recording density.

Notably, while the description above exemplarily presents a case where the present technology is applied to a playback device in which only playback of the optical disc D is enabled, the present disclosure can also be preferably applied to a recording/playing-back device in which recording to the optical disc D is also enabled.

Additionally, the present technology may also be configured as below.

(1)

An optical recording medium drive device including:

a light irradiation unit that performs light irradiation on an optical recording medium;

a light receiving unit that receives reflected light from the optical recording medium and in which four regions of a first region, a second region, a third region and a fourth region are dividedly formed with a linear direction division line that extends in a direction corresponding to a longitudinal direction of a track formed in the optical recording medium and a tracking direction division line that extends in a direction corresponding to a short-side direction of the track, the first region and second region and the third region and fourth region being respectively segmented with the linear direction division line, the first region and fourth region and the second region and third region being respectively segmented with the tracking direction division line, the first region and second region and the third region and fourth region being arranged on an upstream side and a downstream side, respectively, on the basis of a direction of advancement of the track as a reference;

a binarization unit that obtains binarization signals based on light reception signals which are obtained by the regions for light reception in the light receiving unit as a first signal, a second signal, a third signal and a fourth signal, respectively;

delay units that delay the first signal, the second signal, the third signal and the fourth signal, respectively;

a first exclusive OR calculation unit that calculates exclusive OR between the first signal inputted not via the delay unit and the third signal inputted via the delay unit;

a second exclusive OR calculation unit that calculates exclusive OR between the first signal inputted via the delay unit and the third signal inputted not via the delay unit;

a third exclusive OR calculation unit that calculates exclusive OR between the second signal inputted not via the delay unit and the fourth signal inputted via the delay unit;

a fourth exclusive OR calculation unit that calculates exclusive OR between the second signal inputted via the delay unit and the fourth signal inputted not via the delay unit; and a first operation unit that calculates a difference between a sum of the pieces of exclusive OR calculated by the first and third exclusive OR calculation units, respectively, and a sum of the pieces of exclusive OR calculated by the second and fourth exclusive OR calculation units, respectively, wherein the first to fourth exclusive OR calculation units and the first operation unit operate asynchronous to channel clock.

(2)

The optical recording medium drive device according to (1), wherein when a phase difference between a sum signal of the first signal and the third signal and a sum signal of the second signal and the fourth signal in an occasion of a beam spot that is formed with the light irradiation by the light irradiation unit to be at a middle point between centers of the track is placed as a maximum phase difference, delay time corresponding to one half of the maximum phase difference is configured in the delay unit.

(3)

The optical recording medium drive device according to (1) or (2), including a low-pass filter that performs smoothing on an output signal of the first operation unit.

(4)

The optical recording medium drive device according to any one of (1) to (3), including a delay control unit that variably configures delay time in the delay unit.

(5)

The optical recording medium drive device according to (4), wherein the delay control unit variably configures the delay time in the delay unit in accordance with a kind and linear velocity of the optical recording medium.

(6)

The optical recording medium drive device according to any one of (1) to (5), including:

a fifth exclusive OR calculation unit that calculates exclusive OR between the first signal and the third signal;

a sixth exclusive OR calculation unit that calculates exclusive OR between the second signal and the fourth signal; and a second operation unit that calculates a sum of the pieces of exclusive OR calculated by the fifth and sixth exclusive OR calculation units, respectively, wherein the fifth and sixth exclusive OR calculation units and the second operation unit operate asynchronous to the channel clock.

REFERENCE SIGNS LIST

1 Playback device
OP Optical pickup
SLD Sled mechanism
2 Spindle motor
3 Objective lens
4 Biaxial mechanism
5 Quadruple detector
6 Matrix circuit
7 Servo circuit
12 PLL circuit
13 and 35 Controllers
15A to 15D I/V conversion amplifiers
16A to 16D BPFs
17A to 17D Binarization circuits
18A to 18D Buffers
19A to 19D and 19Av to 19Dv Delay circuits
20-1 to 20-4, 20-1' to 20-4', 23-AC, 23-BD, 23-AC' and 23-BD' EXOR circuits
21 and 24 Operation units
22, 22-1 to 22-4, 22-AC and 22-BD LPFs
25 and 25' BPFs
31 Binarization circuit
32 Pull-in control unit 36 Delay time/operation clock switching unit
40 and 43 Amplifiers
D Optical disc

The invention claimed is:

1. An optical recording medium drive device comprising:
a light irradiation unit that performs light irradiation on an optical recording medium;
a light receiving unit that receives reflected light from the optical recording medium and in which four regions of a first region, a second region, a third region and a fourth region are dividedly formed with a linear direction division line that extends in a direction corresponding to a longitudinal direction of a track formed in the optical recording medium and a tracking direction division line that extends in a direction corresponding to a short-side direction of the track, the first region and second region and the third region and fourth region being respectively segmented with the linear direction division line, the first region and fourth region and the second region and third region being respectively segmented with the tracking direction division line, the first region and second region and the third region and fourth region being arranged on an upstream side and a downstream side, respectively, on the basis of a direction of advancement of the track as a reference;
a binarization unit that obtains binarization signals based on light reception signals which are obtained by the regions for light reception in the light receiving unit as a first signal, a second signal, a third signal and a fourth signal, respectively;
delay units that delay the first signal, the second signal, the third signal and the fourth signal, respectively;
a first exclusive OR calculation unit that calculates exclusive OR between the first signal inputted not via the delay unit and the third signal inputted via the delay unit;
a second exclusive OR calculation unit that calculates exclusive OR between the first signal inputted via the delay unit and the third signal inputted not via the delay unit;
a third exclusive OR calculation unit that calculates exclusive OR between the second signal inputted not via the delay unit and the fourth signal inputted via the delay unit;
a fourth exclusive OR calculation unit that calculates exclusive OR between the second signal inputted via the delay unit and the fourth signal inputted not via the delay unit; and
a first operation unit that calculates a difference between a sum of the pieces of exclusive OR calculated by the first and third exclusive OR calculation units, respectively, and a sum of the pieces of exclusive OR calculated by the second and fourth exclusive OR calculation units, respectively,
wherein the first to fourth exclusive OR calculation units and the first operation unit operate asynchronous to channel clock.

2. The optical recording medium drive device according to claim 1,
wherein when a phase difference between a sum signal of the first signal and the third signal and a sum signal of the second signal and the fourth signal in an occasion of a beam spot that is formed with the light irradiation by the light irradiation unit to be at a middle point between centers of the track is placed as a maximum phase difference, delay time corresponding to one half of the maximum phase difference is configured in the delay unit.

3. The optical recording medium drive device according to claim 2, comprising
a low-pass filter that performs smoothing on an output signal of the first operation unit.

4. The optical recording medium drive device according to claim 1, comprising
a delay control unit that variably configures delay time in the delay unit.

5. The optical recording medium drive device according to claim 4,
wherein the delay control unit variably configures the delay time in the delay unit in accordance with a kind and linear velocity of the optical recording medium.

6. The optical recording medium drive device according to claim 1, comprising:
a fifth exclusive OR calculation unit that calculates exclusive OR between the first signal and the third signal;
a sixth exclusive OR calculation unit that calculates exclusive OR between the second signal and the fourth signal; and
a second operation unit that calculates a sum of the pieces of exclusive OR calculated by the fifth and sixth exclusive OR calculation units, respectively,
wherein the fifth and sixth exclusive OR calculation units and the second operation unit operate asynchronous to the channel clock.

7. A tracking error detection method comprising:
a light reception procedure of receiving reflected light of light with which an optical recording medium is irradiated by a light receiving unit in which four regions of a first region, a second region, a third region and a fourth region are dividedly formed with a linear direction division line that extends in a direction corresponding to a longitudinal direction of a track formed in the optical recording medium and a tracking direction division line that extends in a direction corresponding to a short-side direction of the track, the first region and second region and the third region and fourth region being respectively segmented with the linear direction division line, the first region and fourth region and the second region and third region being respectively segmented with the tracking direction division line, the first region and second region and the third region and fourth region being arranged on an upstream side and a downstream side, respectively, on the basis of a direction of advancement of the track as a reference;
a binarization procedure of obtaining binarization signals based on light reception signals which are obtained by the regions for light reception in the light receiving unit as a first signal, a second signal, a third signal and a fourth signal, respectively;
delay procedures of delaying the first signal, the second signal, the third signal and the fourth signal, respectively;
a first exclusive OR calculation procedure of calculating exclusive OR between the first signal inputted not via delay in the delay procedure and the third signal inputted via delay in the delay procedure;
a second exclusive OR calculation procedure of calculating exclusive OR between the first signal inputted via delay in the delay procedure and the third signal inputted not via delay in the delay procedure;
a third exclusive OR calculation procedure of calculating exclusive OR between the second signal inputted not via delay in the delay procedure and the fourth signal inputted via delay in the delay procedure;

a fourth exclusive OR calculation procedure of calculating exclusive OR between the second signal inputted via delay in the delay procedure and the fourth signal inputted not via delay in the delay procedure; and a first operation procedure of calculating a difference between a sum of the pieces of exclusive OR calculated in the first and third exclusive OR calculation procedures, respectively, and a sum of the pieces of exclusive OR calculated in the second and fourth exclusive OR calculation procedures, respectively, wherein calculation in the first to fourth exclusive OR calculation procedures and the first operation procedure is performed asynchronous to channel clock.

* * * * *